United States Patent
Si et al.

(10) Patent No.: US 11,070,333 B2
(45) Date of Patent: Jul. 20, 2021

(54) METHOD AND APPARATUS FOR SS/PBCH BLOCK FREQUENCY LOCATION INDICATION

(71) Applicant: Samsung Electronics Co., Ltd, Suwon-si (KR)

(72) Inventors: Hongbo Si, Plano, TX (US); Young Han Nam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 110 days.

(21) Appl. No.: 16/218,137

(22) Filed: Dec. 12, 2018

(65) Prior Publication Data

US 2019/0200307 A1 Jun. 27, 2019

Related U.S. Application Data

(60) Provisional application No. 62/608,768, filed on Dec. 21, 2017, provisional application No. 62/609,914, (Continued)

(51) Int. Cl.
*H04L 5/00* (2006.01)
*H04W 56/00* (2009.01)
(Continued)

(52) U.S. Cl.
CPC ........ *H04L 5/0048* (2013.01); *H04L 27/2602* (2013.01); *H04L 27/2666* (2013.01);
(Continued)

(58) Field of Classification Search
CPC ..... H04L 5/0048; H04L 5/0007; H04L 5/005; H04L 27/2602; H04L 27/2666;
(Continued)

(56) References Cited

U.S. PATENT DOCUMENTS

2017/0311250 A1 10/2017 Rico Alvarino et al.
2018/0337755 A1* 11/2018 John Wilson ......... H04L 5/0048
(Continued)

FOREIGN PATENT DOCUMENTS

EP 3515123 A1 7/2019
WO 2018213026 A1 11/2018

OTHER PUBLICATIONS

ZTE et al., "Remaining details of RMSI", 3GPP TSG RAN WG1 Meeting #91, Nov. 27-Dec. 1, 2017, 22 pages, R1-1719342.

(Continued)

*Primary Examiner* — Joshua Kading

(57) ABSTRACT

A UE in a wireless communication system is provided. The UE comprises a transceiver configured to receive, from a BS, a SS/PBCH block including the PBCH using a first frequency location (GSCN-Current) over downlink channels, GSCN-Current being based on a set of predefined synchronization rasters that is determined by a global synchronization channel number (GSCN). The UE further comprises a processor operably connected to the transceiver, the processor configured to determine the SS/PBCH block, identify content of a PBCH included in the determined SS/PBCH block, determine a configuration for at least one of the SS/PBCH block that is associated with a PDCCH including scheduling information for RMSI on the GSCN-Current or the SS/PBCH block that is not associated with the PDCCH including the scheduling information for the RMSI on the GSCN-Current.

16 Claims, 10 Drawing Sheets

Related U.S. Application Data filed on Dec. 22, 2017, provisional application No. 62/614,716, filed on Jan. 8, 2018, provisional application No. 62/616,796, filed on Jan. 12, 2018, provisional application No. 62/625,651, filed on Feb. 2, 2018, provisional application No. 62/628,475, filed on Feb. 9, 2018, provisional application No. 62/710,373, filed on Feb. 16, 2018, provisional application No. 62/635,695, filed on Feb. 27, 2018, provisional application No. 62/636,271, filed on Feb. 28, 2018, provisional application No. 62/638,551, filed on Mar. 5, 2018, provisional application No. 62/758,111, filed on Nov. 9, 2018.

(51) Int. Cl.
*H04W 72/04* (2009.01)
*H04L 27/26* (2006.01)

(52) U.S. Cl.
CPC ....... *H04W 56/001* (2013.01); *H04W 72/042* (2013.01); *H04W 72/0453* (2013.01); *H04L 5/0007* (2013.01)

(58) Field of Classification Search
CPC ............ H04L 27/0014; H04W 56/001; H04W 72/0453; H04W 72/042; H04W 48/08
See application file for complete search history.

(56) References Cited

U.S. PATENT DOCUMENTS

| | | | | |
|---|---|---|---|---|
| 2018/0376511 | A1* | 12/2018 | Tsai | H04W 74/0833 |
| 2019/0089474 | A1* | 3/2019 | Ly | H04L 5/0091 |
| 2019/0150121 | A1* | 5/2019 | Abdoli | H04W 72/0453 370/329 |
| 2019/0159226 | A1* | 5/2019 | Ly | H04L 5/0053 |
| 2019/0223084 | A1* | 7/2019 | John Wilson | H04W 48/12 |
| 2019/0223163 | A1 | 7/2019 | Ko et al. | |
| 2019/0327767 | A1* | 10/2019 | Islam | H04W 72/046 |

OTHER PUBLICATIONS

"3rd Generation Partnership Project; Technical Specification Group Radio Access Network; NR; Physical layer procedures for control (Release 15)", 3GPP TS 38.213 V2.0.0 (Dec. 2017), 56 pages.

"3rd Generation Partnership Project; Technical Specification Group Radio Access Network; NR; Base Station (BS) radio transmission and reception (Release 15)", 3GPP TS 38.104 V1.0.0 (Dec. 2017), 124 pages.

ITL, "On remaining details of SS/PBCH block", 3GPP TSG RAN WG1 Meeting 91, Nov. 27-Dec. 1, 2017, 6 pages, R1-1720563.

International Search Report dated Mar. 12, 2019 in connection with International Patent Application No. PCT/KR2018/016499, 3 pages.

"3rd Generation Partnership Project;Technical Specification Group Radio Access Network; Evolved Universal Terrestrial Radio Access (E-UTRA); Physical channels and modulation (Release 13)", 3GPP TS 36.211 V13.2.0, Technical Specification, Jun. 2016, 168 pages.

"3rd Generation Partnership Project;Technical Specification Group Radio Access Network; Evolved Universal Terrestrial Radio Access (E-UTRA); Multiplexing and channel coding (Release 13)", 3GPP TS 36.212 V13.2.0, Technical Specification, Jun. 2016, 140 pages.

"3rd Generation Partnership Project;Technical Specification Group Radio Access Network; Evolved Universal Terrestrial Radio Access (E-UTRA); Physical layer procedures (Release 13)", 3GPP TS 36.213 V13.2.0, Technical Specification, Jun. 2016, 756 pages.

"3rd Generation Partnership Project;Technical Specification Group Radio Access Network; Evolved Universal Terrestrial Radio Access (E-UTRA); Medium Access Control (MAC) protocol specification (Release 13)", 3GPP TS 36.321 V13.2.0, Technical Specification, Jun. 2016, 91 pages.

"3rd Generation Partnership Project;Technical Specification Group Radio Access Network; Evolved Universal Terrestrial Radio Access (E-UTRA); Radio Resource Control (RRC); Protocol specification (Release 13)", 3GPP TS 36.331 V13.2.0, Technical Specification, Jun. 2016, 623 pages.

Samsung, "Remaining Details on RMSI," R1-1720274, 3GPP TSG RAN WG1#91, Reno, USA, Nov. 27-Dec. 1, 2017, 19 pages.

Supplementary European Search Report dated Nov. 12, 2020 in connection with European Application No. 18893090.3. 14 pages.

\* cited by examiner

METHOD AND APPARATUS FOR SS/PBCH BLOCK FREQUENCY LOCATION INDICATION

CROSS-REFERENCE TO RELATED APPLICATION(S) AND CLAIM OF PRIORITY

The present application claims priority to:
U.S. Provisional Patent Application Ser. No. 62/608,768, filed on Dec. 21, 2017;
U.S. Provisional Patent Application Ser. No. 62/609,914, filed on Dec. 22, 2017;
U.S. Provisional Patent Application Ser. No. 62/614,718, filed on Jan. 8, 2018;
U.S. Provisional Patent Application Ser. No. 62/616,796, filed on Jan. 12, 2018;
U.S. Provisional Patent Application Ser. No. 62/625,651, filed on Feb. 2, 2018;
U.S. Provisional Patent Application Ser. No. 62/628,475, filed on Feb. 9, 2018;
U.S. Provisional Patent Application Ser. No. 62/710,373, filed on Feb. 16, 2018;
U.S. Provisional Patent Application Ser. No. 62/635,695, filed on Feb. 27, 2018;
U.S. Provisional Patent Application Ser. No. 62/636,271, filed on Feb. 28, 2018;
U.S. Provisional Patent Application Ser. No. 62/638,551, filed on Mar. 5, 2018; and
U.S. Provisional Patent Application Ser. No. 62/758,111, filed on Nov. 9, 2018.
The content of the above-identified patent documents are incorporated herein by reference.

TECHNICAL FIELD

The present application relates generally to signal indication. More specifically, the present disclosure relates to SS/PBCH block frequency location indication in an advanced wireless communication system.

BACKGROUND

For a new radio (NR) licensed spectrum, each synchronization and physical broadcasting channel (PBCH) signal block (SS/PBCH block) comprises one symbol for NR-primary synchronization signal (NR-PSS), two symbols for NR-PBCH, and one symbol for NR-secondary synchronization signal (NR-SSS) and NR-PBCH, where the four symbols are mapped consecutively and time division multiplexed. An NR-SS is a unified design, including the NR-PSS and NR-SSS sequence design, for all supported carrier frequency ranges in the NR. The transmission bandwidth of NR-PSS and NR-SSS is smaller than the transmission bandwidth of the whole SS/PBCH block. For initial cell selection for an NR cell, a UE assumes the default SS burst set periodicity as 20 ms, and for detecting a non-standalone NR cell, network provides one SS burst set periodicity information per frequency carrier to the UE and information to derive measurement timing/duration. Other than a master information block (MIB), the remaining minimum system information (RMSI) is carried by physical downlink shared channel (PDSCH) with scheduling info carried by the corresponding physical downlink control channel (PDCCH). A control resource set (CORESET) for receiving common control channels is required to be configured, and can be transmitted in PBCH.

SUMMARY

Embodiments of the present disclosure provide an SS/PBCH block frequency location indication in an advanced wireless communication system.

In one embodiment, a base station (BS) in a wireless communication system is provided. The BS comprises a processor configured to generate a synchronization signal and physical broadcast channel (SS/PBCH) block, identify a first frequency location (GSCN-Current) based on a set of predefined synchronization rasters that is determined by a global synchronization channel number (GSCN) to transmit the SS/PBCH block, determine, based on the GSCN-Current, a configuration for at least one of the SS/PBCH block that is associated with a physical downlink control channel (PDCCH) including scheduling information for remaining minimum system information (RMSI) on the GSCN-Current or the SS/PBCH block that is not associated with the PDCCH including the scheduling information for the RMSI on the GSCN-Current, determine, when the SS/PBCH block is not associated with the PDCCH including the scheduling information for the RMSI on the GSCN-Current, the configuration to include at least one of a frequency range in which no other SS/PBCH blocks configured with the PDCCH including the scheduling information for the RMSI are transmitted, the frequency range determined based on the GSCN or a second frequency location on which other SS/PBCH blocks configured with the PDCCH including the scheduling information for the RMSI are transmitted, the second frequency location determined based on the GSCN, and identify, based on the determined configuration, content of a PBCH included in the SS/PBCH block. The BS further comprises a transceiver operably connected to the processor, the transceiver configured to transmit, to a user equipment (UE), the SS/PBCH block including the PBCH using the GSCN-Current over downlink channels.

In another embodiment, a user equipment (UE) in a wireless communication system is provided. The UE comprises a transceiver configured to receive, from a base station (BS), a synchronization signal and physical broadcast channel (SS/PBCH) block including the PBCH using a first frequency location (GSCN-Current) over downlink channels, GSCN-Current being based on a set of predefined synchronization rasters that is determined by a global synchronization channel number (GSCN). The UE further comprises a processor operably connected to the transceiver, the processor configured to decode a PBCH included in the SS/PBCH block, identify content of the decoded PBCH, determine a configuration for at least one of the SS/PBCH block that is associated with a physical downlink control channel (PDCCH) including scheduling information for remaining minimum system information (RMSI) on the GSCN-Current or the SS/PBCH block that is not associated with the PDCCH including the scheduling information for the RMSI on the GSCN-Current, and determine, when the SS/PBCH block is not associated with the PDCCH including the scheduling information for the RMSI on the GSCN-Current, the configuration to include at least one of a frequency range in which no other SS/PBCH blocks configured with the PDCCH including the scheduling information for the RMSI are transmitted, the frequency range determined based on the GSCN or a second frequency location on which other SS/PBCH blocks configured with the PDCCH including the scheduling information for the RMSI are transmitted, the GSCN-Current determined based on the GSCN.

In yet another embodiment, a method of a user equipment (UE) in a wireless communication system is provided. The method comprises receiving, from a base station (BS), a synchronization signal and physical broadcast channel (SS/PBCH) block including the PBCH using a first frequency location (GSCN-Current) over downlink channels, GSCN-Current being based on a set of predefined synchronization rasters that is determined by a global synchronization channel number (GSCN), decoding a PBCH included in the received SS/PBCH block, identifying content of the decoded PBCH, determining a configuration for at least one of the SS/PBCH block that is associated with a physical downlink control channel (PDCCH) including scheduling information for remaining minimum system information (RMSI) on the GSCN-Current, or the SS/PBCH block that is not associated with the PDCCH including the scheduling information for the RMSI on the GSCN-Current, and determining, when the SS/PBCH block is not associated with the PDCCH including the scheduling information for the RMSI on the GSCN-Current, the configuration to include at least one of a frequency range in which no other SS/PBCH blocks configured with the PDCCH including the scheduling information for the RMSI are transmitted, the frequency range determined based on the GSCN, or a second frequency location on which other SS/PBCH blocks configured with the PDCCH including the scheduling information for the RMSI are transmitted, the GSCN-Current determined based on the GSCN.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v13.2.0, "E-UTRA, Physical channels and modulation;" 3GPP TS 36.212 v13.2.0, "E-UTRA, Multiplexing and Channel coding;" 3GPP TS 36.213 v13.2.0, "E-UTRA, Physical Layer Procedures;" 3GPP TS 36.321 v13.2.0, "E-UTRA, Medium Access Control (MAC) protocol specification;" and 3GPP TS 36.331 v13.2.0, "E-UTRA, Radio Resource Control (RRC) protocol specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is provided to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
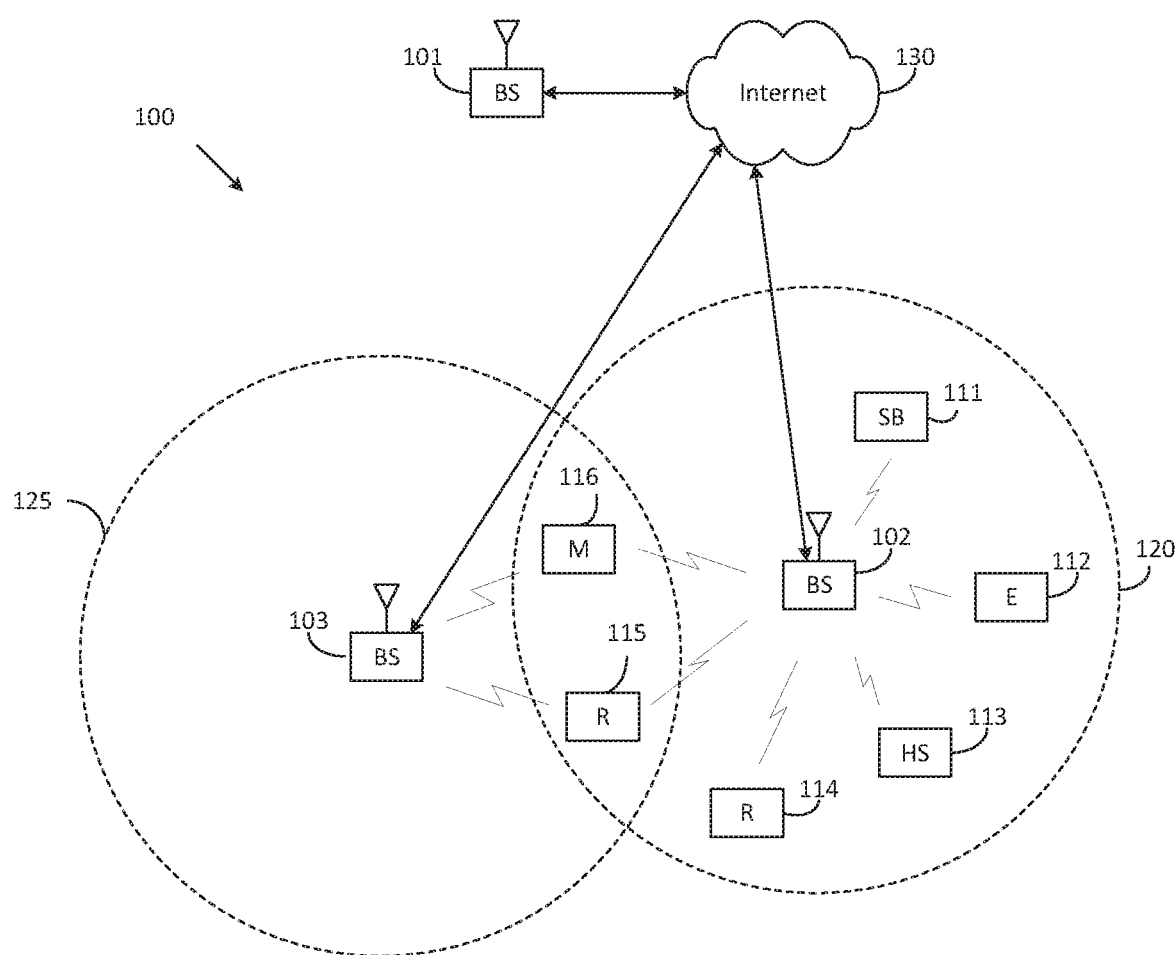
FIG. 1 illustrates an example wireless network according to embodiments of the present disclosure.
Figure 2:
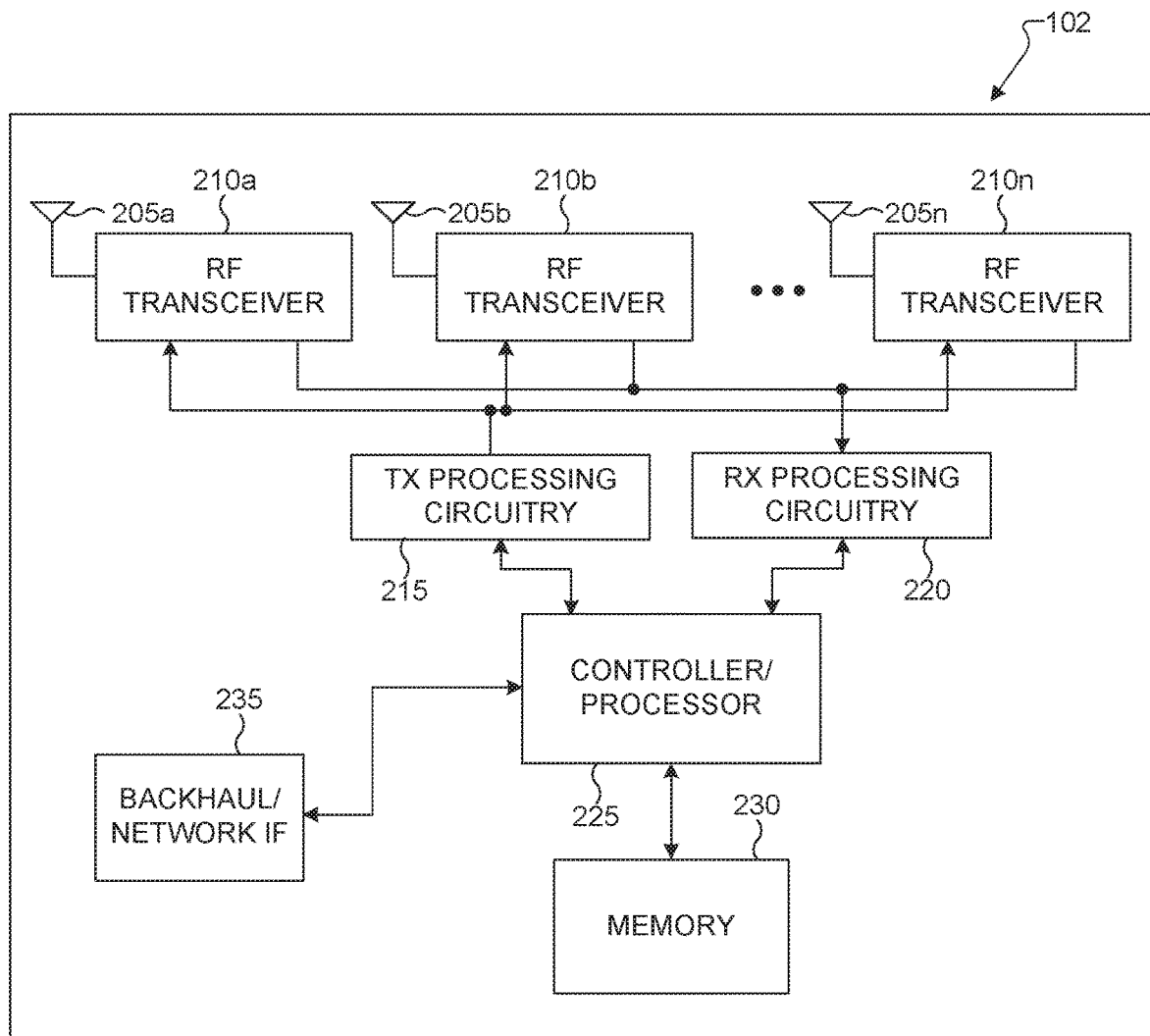
FIG. 2 illustrates an example eNB according to embodiments of the present disclosure.
Figure 3:
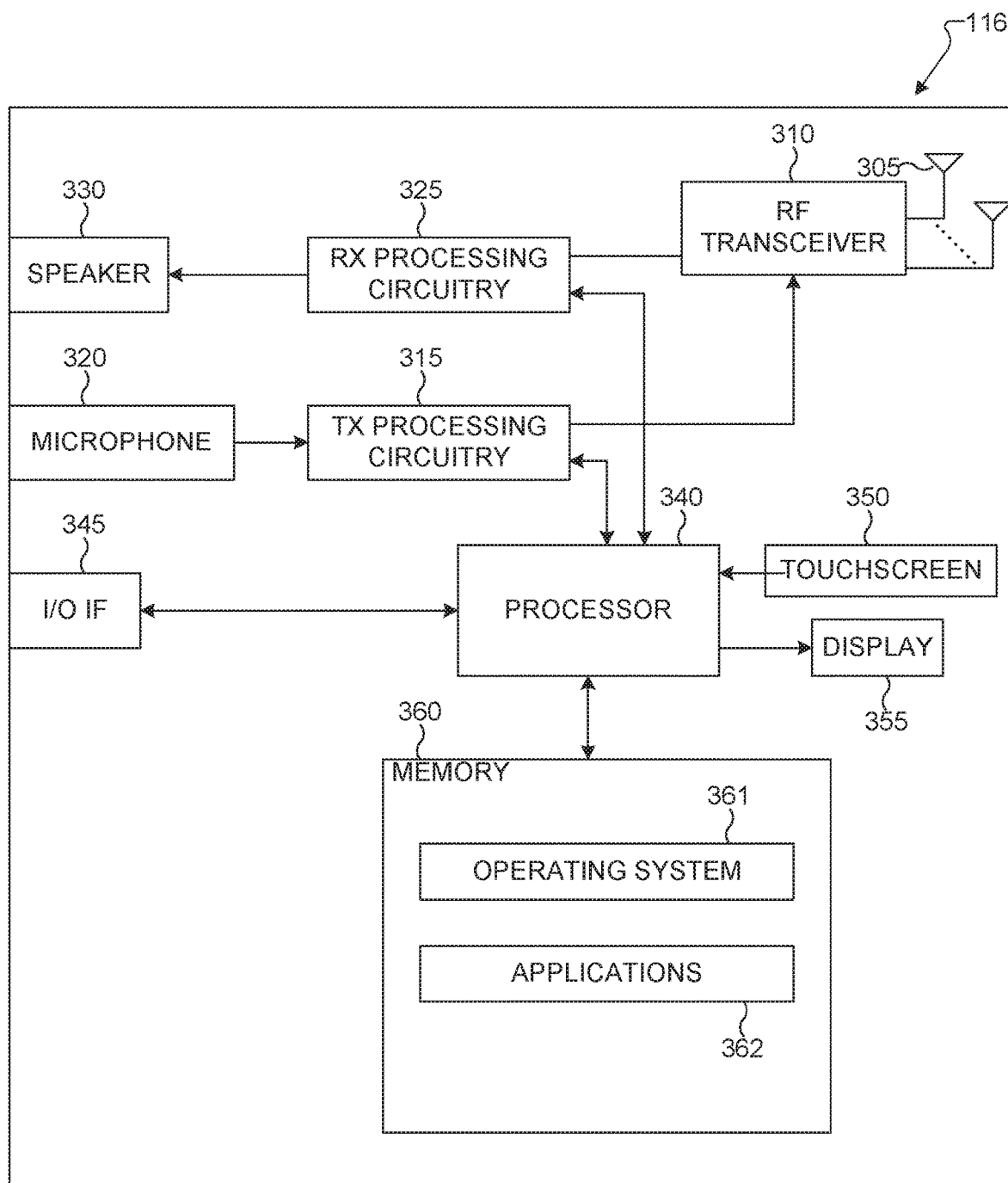
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient SS/PBCH block frequency location indication. In certain embodiments, and one or more of the eNBs 101-103 includes circuitry, programming, or a combination thereof, for efficient SS/PBCH block frequency location indication.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of the present disclosure to any particular implementation of an eNB.

As shown in FIG. 2, the eNB 102 includes multiple antennas 205*a*-205*n*, multiple RF transceivers 210*a*-210*n*, transmit (TX) processing circuitry 215, and receive (RX) processing circuitry 220. The eNB 102 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the eNB 102. For example, the controller/processor 225 could control the reception of forward channel signals and the transmission of reverse channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205*a*-205*n* are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
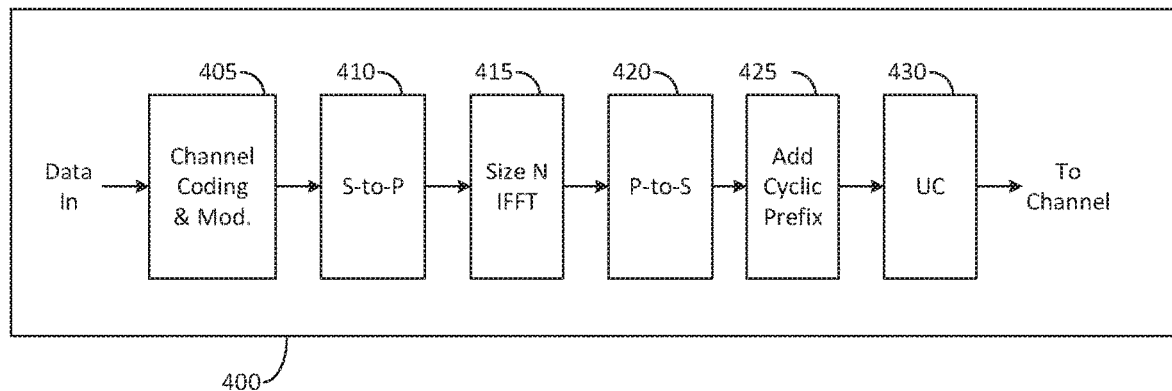
FIG. 4A illustrates a high-level diagram of an orthogonal frequency division multiple access transmit path according to embodiments of the present disclosure.
Figure 4B:
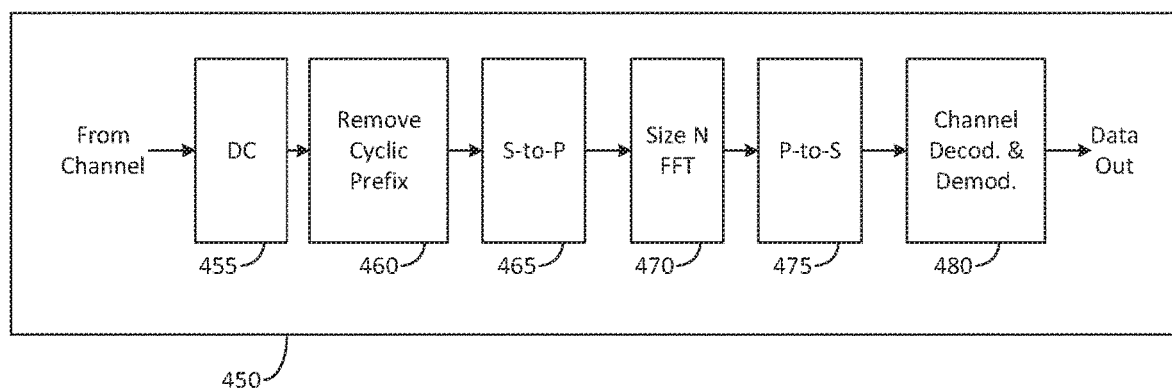
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized when possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the BCCH conveys a master information block (MIB) or to a DL shared channel (DL-SCH) when the BCCH conveys a system information block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with special system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
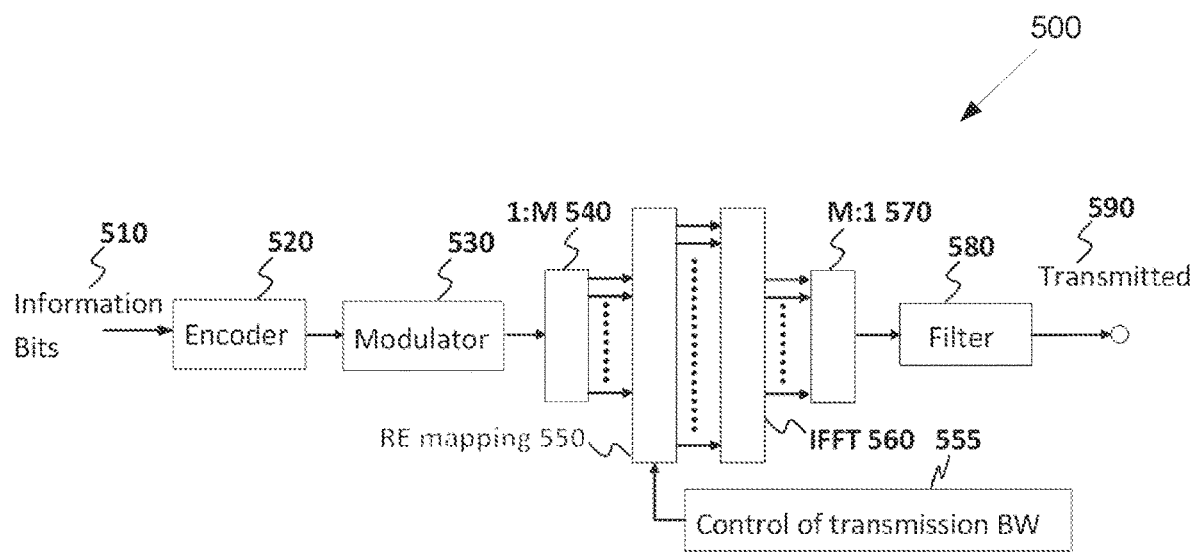
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of the present disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
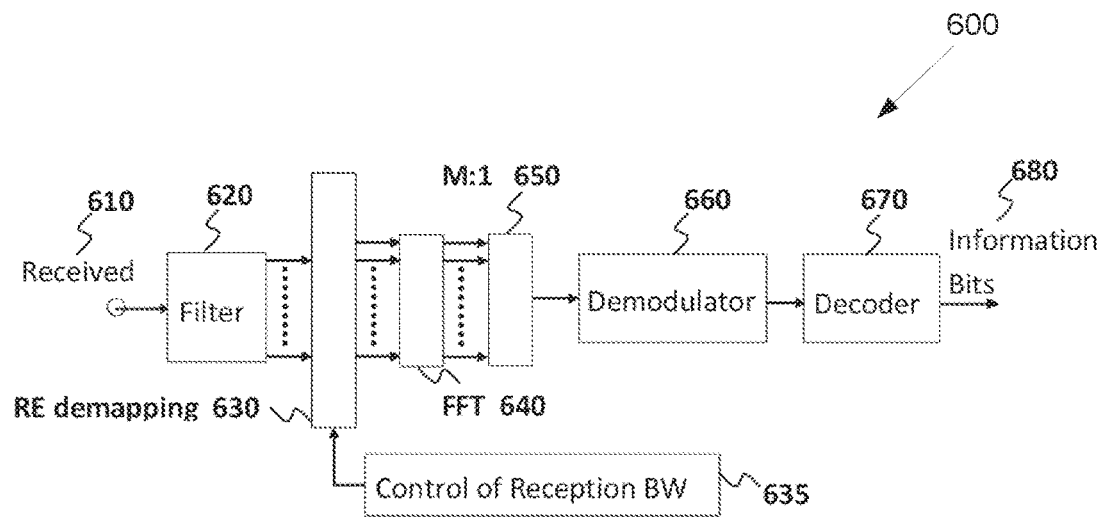
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of the present disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
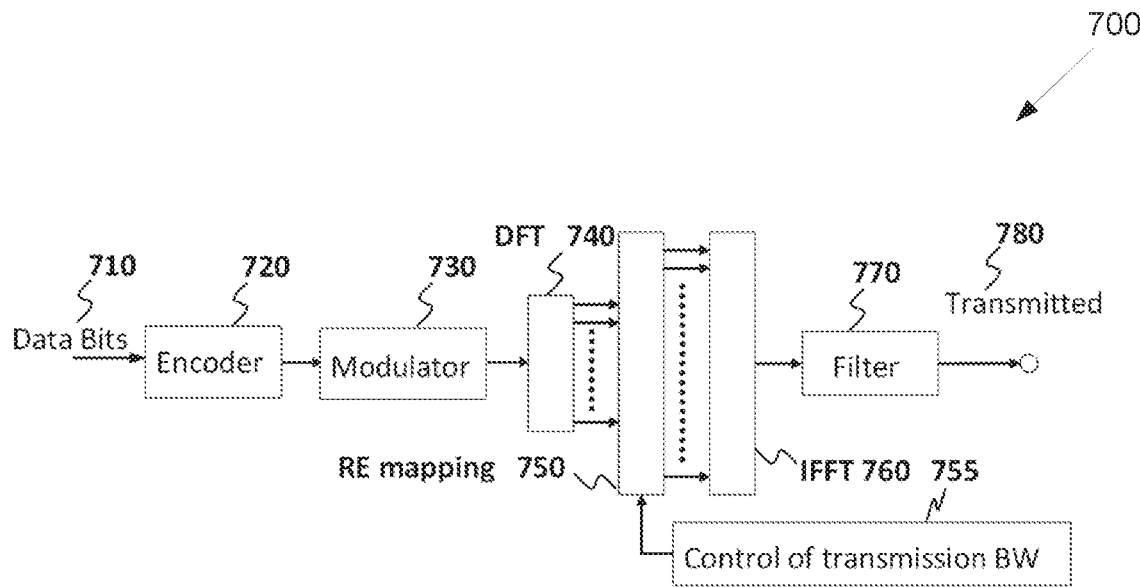
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of the present disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
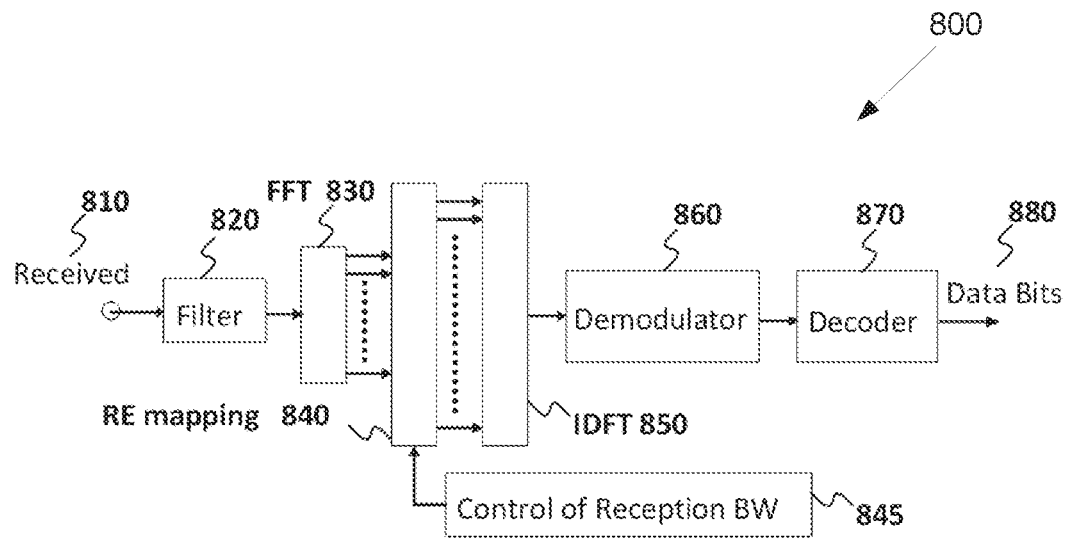
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of the present disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed 'enhanced mobile broadband' (eMBB), targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

In order for the 5G network to support such diverse services with different quality of services (QoS), one embodiment has been identified in LTE specification, called network slicing. To utilize PHY resources efficiently and multiplex various slices (with different resource allocation schemes, numerologies, and scheduling strategies) in DL-SCH, a flexible and self-contained frame or subframe design is utilized.

Power consumption and battery life are very important for terminals in an internet of thing (IoT). In a narrowband IoT (NB-IoT) or an enhanced machine type communication (eMTC) system, the power of terminal devices can be saved by means of configuring a power saving mode (PSM) or an extended discontinuous reception (eDRX) mode. However, a UE is unable to listen paging messages during sleep in the PSM mode or the eDRX mode. In some IoT application scenarios, a UE is required to establish a connection with a network within a certain period of time after receiving a network command. Then the UE that has the requirement cannot be configured with the PSM mode or the eDRX mode that has a relatively long period.

In NB-IoT and an enhanced version of eMTC system, to enable a UE to be paged, and meanwhile to save power, a wake-up or sleep signal/channel is introduced after study and research. The wake-up signal/channel is configured to wake up a UE, i.e., a case where the UE needs to continue to monitor a subsequent MTC physical downlink control channel (MPDCCH) that is used to indicate a paging message. The sleep signal/channel is configured to instruct that a UE may enter into a sleep state, i.e., a case where the UE does not need to monitor a subsequent MPDCCH that is used to indicate a paging message.

In a multi-carrier system, a carrier that transmits a synchronization signal is called an anchor carrier, and in an LTE system, a paging signal is transmitted on an anchor carrier. In an NB-IoT system, a scheme for transmitting paging messages on non-anchor carriers is introduced. In the eMTC system, multiple narrowbands are defined, in which a narrowband has 6 physical resource blocks (PRBs), and the concept of paging narrowband is introduced. In addition, in the eMTC system, a downlink control channel for MTC, MPDCCH, is configured to indicate a paging message, and different UEs may monitor MPDCCHs on different narrowbands. Similarly, in an ongoing 5G new radio (NR) system, there is a situation where the bandwidth of a UE is smaller than a system bandwidth, and in this case, multiple bandwidth parts may be defined for a paging channel. For the case of multi-carrier or narrowbands or partial bandwidths, it is an issue yet to be solved that how to transmit and receive a wake-up or sleep signal.

Figure 9:
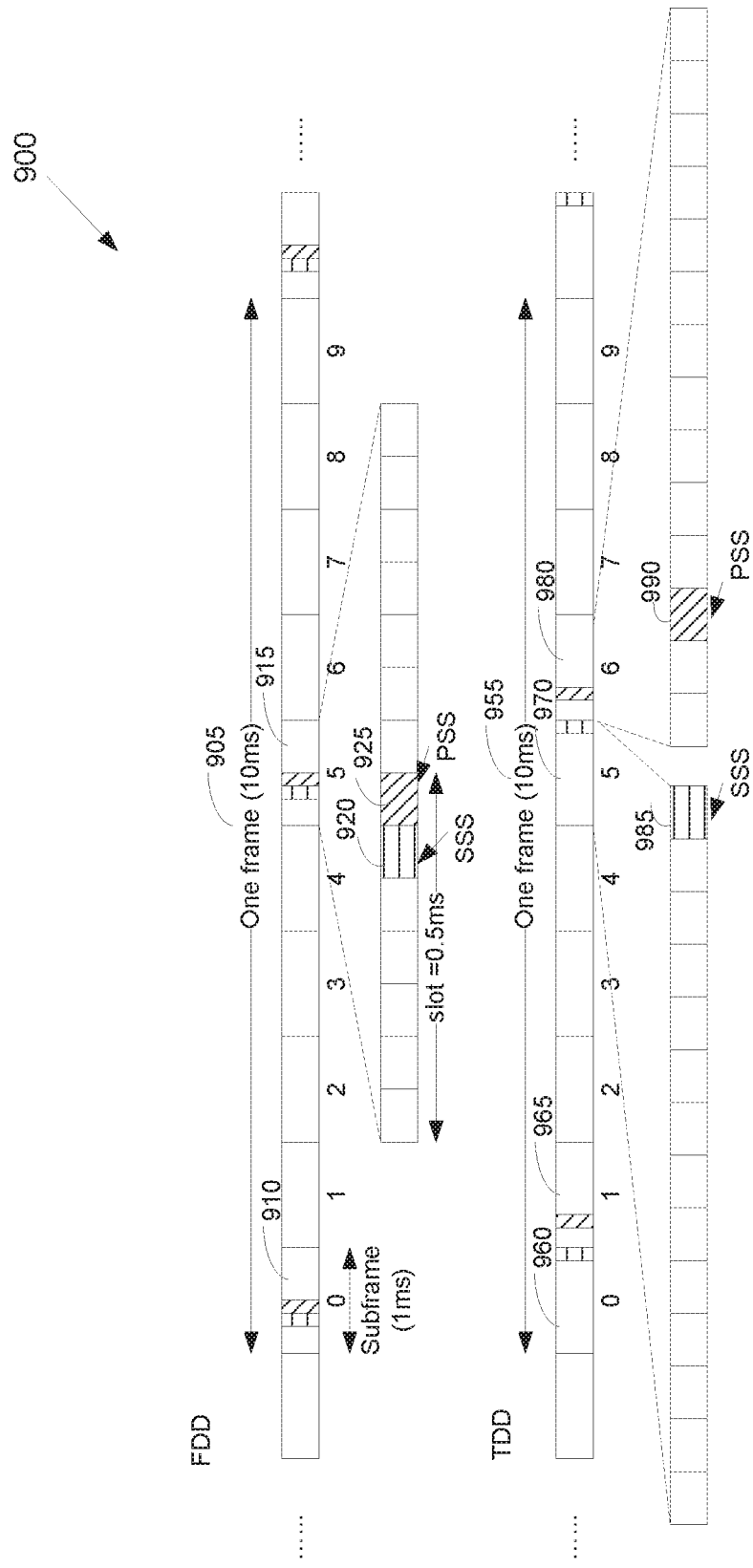
FIG. 9 illustrates an example time domain positions for the mapping of PSS/SSS for FDD and TDD according to embodiments of the present disclosure.

FIG. 9 illustrates an example time domain positions 900 for the mapping of PSS/SSS for FDD and TDD according to embodiments of the present disclosure. The embodiment of the time domain positions 900 illustrated in FIG. 9 is for illustration only. FIG. 9 does not limit the scope of the present disclosure to any particular implementation.

Referring to FIG. 9, in case of FDD, in every frame (905), a PSS (925) is transmitted within a last symbol of a first slot of subframes 0 and 5 (910 and 915), wherein a subframe includes two slots. An SSS (920) is transmitted within a second last symbol of a same slot. In case of TDD, in every frame (955), a PSS (990) is transmitted within a third symbol of subframes 1 and 6 (965 and 980), while an (SSS) 985 is transmitted in a last symbol of subframes 0 and 5 (960 and 970). The difference allows for the detection of the duplex scheme on a cell. The resource elements for PSS and SSS are not available for transmission of any other type of DL signals.

In the present disclosure, for brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

This present disclosure covers several components which can be used in conjunction or in combination with one another, or can operate as standalone schemes.

A communication system includes a downlink (DL) that conveys signals from transmission points such as base stations (BSs) or NodeBs to user equipments (UEs) and an uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB. For NR systems, a NodeB is often referred as a gNodeB.

In the present disclosure, numerology refers to a set of signal parameters which can include subframe duration, sub-carrier spacing, cyclic prefix length, transmission bandwidth, or any combination of these signal parameters.

For LTE initial access, primary and secondary synchronization signals (PSS and SSS, respectively) are used for coarse timing and frequency synchronization and cell ID acquisition. Since PSS/SSS is transmitted twice per 10 ms radio frame and time-domain enumeration is introduced in terms of system frame number (SFN, included in the MIB), frame timing is detected from PSS/SSS to avoid the need for increasing the detection burden from PBCH. In addition, cyclic prefix (CP) length and, if unknown, duplexing scheme can be detected from PSS/SSS.

The PSS is constructed from a frequency-domain ZC sequence of length 63, with the middle element truncated to avoid using the d.c. subcarrier. Three roots are selected for PSS to represent the three physical layer identities within each group of cells. The SSS sequences are based on the maximum length sequences (also known as M-sequences).

Each SSS sequence is constructed by interleaving two length-31 BPSK modulated sequences in frequency domain, where the two source sequences before modulation are different cyclic shifts of the same M-sequence. The cyclic shift indices are constructed from the physical cell ID group. Since PSS/SSS detection can be faulty (due to, for instance, non-idealities in the auto- and cross-correlation properties of PSS/SSS and lack of CRC protection), cell ID hypotheses detected from PSS/SSS may occasionally be confirmed via PBCH detection.

PBCH is primarily used to signal the Master Block Information (MIB) which consists of DL and UL system bandwidth information (3 bits), PHICH information (3 bits), and SFN (8 bits). Adding 10 reserved bits (for other uses such as MTC), the MIB payload amounts to 24 bits. After appended with a 16-bit CRC, a rate-1/3 tail-biting convolutional coding, 4× repetition, and QPSK modulation are applied to the 40-bit codeword. The resulting QPSK symbol stream is transmitted across 4 subframes spread over 4 radio frames. Other than detecting MIB, blind detection of the number of CRS ports is also needed for PBCH.

For NR licensed spectrum, each synchronization and PBCH signal block (SS/PBCH block) compromises of one symbol for NR-PSS, two symbols for NR-PBCH, one symbol for NR-SSS and NR-PBCH, where the four symbols are mapped consecutively and time division multiplexed. NR-SS is a unified design, including the NR-PSS and NR-SSS sequence design, for all supported carrier frequency rages in NR. The transmission bandwidth of NR-PSS and NR-SSS (e.g. 12 PRBs) is smaller than the transmission bandwidth of the whole SS/PBCH block (e.g. 20 PRBs). For initial cell selection for NR cell, UE assumes the default SS burst set periodicity as 20 ms, and for detecting non-standalone NR cell, network provides one SS burst set periodicity information per frequency carrier to UE and information to derive measurement timing/duration if possible.

The control resource set (CORESET) for receiving common control channels, such as RMSI, OSI, SIBx, RAR, etc., is required to be configured. According to the recent 3GPP RAN1 agreements, one CORESET configuration is provided via PBCH (or MIB) for at least RMSI scheduling, and another CORESET configuration is provided via RMSI (or SIB1) for at least RAR scheduling. A CORESET (control resource set) may be characterized by slot timing, OFDM symbol numbers in each slot, and frequency resources. These CORESET properties are indicated or pre-configured for each CORESET.

For RMSI/SIB scheduling, the CORESET properties are provided in the PBCH. For RAR scheduling, the CORESET properties are provided in the RMSI. Among these CORESET properties configured by PBCH/RMSI, the OFDM symbol numbers and frequency resources can be commonly applicable to all the common channels (e.g., SIBx/RAR, etc.), but the slot timing can be specifically determined for different SIBx/RAR. In NR, multiple SS/PBCH blocks within a wideband carrier are supported, and some of the SS/PBCH blocks on the same carrier may not be all associated with a RMSI. For those SS/PBCH blocks without associated RMSI, one code-point within the PRB grid offset indication (e.g. 4 bits for >6 GHz and 5 bits for <6 GHz) is utilized to indicate the non-existence of RMSI, and in one example, the 8 bits for RMSI CORESET and search space configuration in MIB can be utilized for other purpose.

This present disclosure considers the utilization of the 8 bits for RMSI CORESET and search space configuration in MIB, potentially together with other field or reserved codepoints, when no RMSI associated is indicated.

In one embodiment, when multiple SS/PBCH blocks are supported on a wideband, at least one of the SS/PBCH blocks can locate on the predefined sync rasters to define a cell for initial access purpose. For those SS/PBCH blocks, which may or may not be associated with a RMSI, and whether or not there is an associated RMSI is indicated by a code-point within the PRB grid offset indication. If a UE successfully detects the SS/PBCH block on a sync raster, and further detects that there is no RMSI associated with the SS/PBCH block, the UE can utilize the field, e.g. 8 bits, which are originally used for RMSI configurations, to indicate the exact location of the next or other SS/PBCH blocks, such that the UE can skip some of the sync raster locations to blindly search.

In one sub-embodiment, some other field in PBCH content or some reserved codepoint from other field(s) in PBCH content can be combined with the 8 bits for RMSI CORESET configuration to obtain a larger indication range. For example, if one extra bit can be combined, the indication range can be enlarged to 511 or 512 (depending on which codepoint indicating no cell-defining SS/PBCH block in the band). For another example, if at most 4 other reserved codepoints can be combined, the indication range can be enlarged to up to 1023 or 1024 (depending on which codepoint indicating no cell-defining SS/PBCH block in the band).

In one embodiment, the exact location of the sync raster where the next SS/PBCH block associated with a RMSI can be located, wherein each of the code-points represents an exact location of a sync raster where an SS/PBCH block can be located. After decoding the code-point, the UE can directly find the frequency location of the sync raster that the UE may search for.

For one sub-embodiment, the relative location to the sync raster with an SS/PBCH block detected is measured by the number of sync rasters, where the number is always non-negative meaning the relative location is always defined along the initial cell search order within the band. The code-point defining the "0" relative location of the next SS/PBCH block is essential, since the code-point can indicate that within the indication capability (e.g. for a bandwidth of 255 sync rasters using the 8 bits), there is no cell-defining SS/PBCH block with RMSI associated, and the UE can skip all the possible sync rasters within the search range and continue to perform blind search from the first sync raster with the relative location that has exceeded the search range from current SS/PBCH block.

TABLE 1 pdcch-ConfigSIB1 (e.g. 8 bits)

| Configuration index in pdcch-ConfigSIB1 | GSCN for cell-defining SS/PBCH block |
|---|---|
| 0 | No cell-defining SS/PBCH block in the search range |
| 1 | GSCN-Current + 1 |
| 2 | GSCN-Current + 2 |
| ... | ... |
| i | GSCN-Current + i |
| ... | ... |
| 255 | GSCN-Current + 255 |

In TABLE 1, GSCN-Current is the global synchronization channel number (GSCN) value for the current SS/PBCH block that is indicated no RMSI presents. In initial cell selection, a UE may assume no associated RMSI presents if the higher layer parameter ssb-SubcarrierOffset takes the value from {r_0, r_1, r_2, r_3}, and the UE may assume the mapping of pdcch-ConfigSIB1 to the GSCN of the synchronization raster that the UE may search for cell-defining SS/PBCH block within the searching band is according to TABLE 1 and a UE assumes no cell-defining SS/PBCH block in the range GSCN-Current to GSCN-Current+255 if pdcch-ConfigSIB1=0.

Note that TABLE 1 can be equivalently given by a formula. In initial cell selection, a UE may assume no associated RMSI presents if the higher layer parameter ssb-SubcarrierOffset takes the value from {r_0, r_1, r_2, r_3}, which corresponds to index-reserved-ssb-SubcarrierOffset taking value of {0, 1, 2, 3}, respectively, and the UE may assume the GSCN of the synchronization raster that the UE may search for cell-defining SS/PBCH block within the searching band is calculated according to GSCN-cell-defined-SSB=GSCN-Current+pdcch-ConfigSIB1, when pdcch-ConfigSIB1>0; and the UE assumes no cell-defining SS/PBCH block in the range GSCN-Current to GSCN-Current+255 if pdcch-ConfigSIB1=0 where GSCN-cell-defined-SSB is the GSCN for the next cell-defined SS/PBCH block, GSCN-Current is the GSCN value for the current SS/PBCH block that is indicated no RMSI presents, index-reserved-ssb-SubcarrierOffset is the index of the reserved codepoint in ssb-SubcarrierOffset (taking value from {0, 1, 2, 3}), and pdcch-ConfigSIB1 is taking value from {0, 1, . . . , 254, 255}.

TABLE 2 pdcch-ConfigSIB1 (e.g. 8 bits) together with reserved codepoint in ssb-SubcarrierOffset

| Reserved codepoint in ssb-SubcarrierOffset | Configuration index in pdcch-ConfigSIB1 | GSCN for cell-defining SS/PBCH block |
|---|---|---|
| r_0 | 0 | No cell-defining SS/PBCH block in the search range |
| r_0 | 1 | GSCN-Current + 1 |
| r_0 | 2 | GSCN-Current + 2 |
| ... | ... | ... |
| r_0 | i | GSCN-Current + i |
| ... | ... | ... |
| r_0 | 255 | GSCN-Current + 255 |
| r_1 | 0 | GSCN-Current + 256 |
| r_1 | 1 | GSCN-Current + 257 |
| ... | ... | ... |
| r_1 | j | GSCN-Current + 256 + j |
| ... | ... | ... |
| r_1 | 255 | GSCN-Current + 511 |
| r_2 | 0 | GSCN-Current + 512 |
| ... | ... | ... |
| r_2 | k | GSCN-Current + 512 + k |
| ... | ... | ... |
| r_2 | 255 | GSCN-Current + 767 |
| r_3 | 0 | GSCN-Current + 768 |
| ... | ... | ... |
| r_3 | 255 | GSCN-Current + 1023 |

In TABLE 2, GSCN-Current is the GSCN value for the current SS/PBCH block that is indicated no RMSI presents. In initial cell selection, a UE may assume no associated RMSI presents if the higher layer parameter ssb-SubcarrierOffset takes the value from {r_0, r_1, r_2, r_3}, and the UE may assume the mapping of ssb-SubcarrierOffset and pdcch-ConfigSIB1 to the GSCN of the synchronization raster that the UE may search for cell-defining SS/PBCH block within the searching band is according to TABLE 2, and UE assumes no cell-defining SS/PBCH block in the range GSCN-Current to GSCN-Current+1023 if {ssb-SubcarrierOffset, pdcch-ConfigSIB1}={r_0, 0}.

Note that TABLE 2 can be equivalently given by a formula. In initial cell selection, a UE may assume no associated RMSI presents if the higher layer parameter ssb-SubcarrierOffset takes the value from {r_0, r_1, r_2, r_3}, which corresponds to index-reserved-ssb-SubcarrierOffset taking value of {0, 1, 2, 3}, respectively, and the UE may assume the GSCN of the synchronization raster that the UE may search for cell-defining SS/PBCH block within the searching band is calculated according to GSCN-cell-defined-SSB=GSCN-Current+256*index-reserved-ssb-SubcarrierOffset+pdcch-ConfigSIB1, when {index-reserved-ssb-SubcarrierOffset, pdcch-ConfigSIB1}≠{0, 0}; and the UE assumes no cell-defining SS/PBCH block in the range GSCN-Current to GSCN-Current+1023 if {index-reserved-ssb-SubcarrierOffset, pdcch-ConfigSIB1}={0, 0}, where GSCN-cell-defined-SSB is the GSCN for the next cell-defined SS/PBCH block, GSCN-Current is the GSCN value for the current SS/PBCH block that is indicated no RMSI presents, index-reserved-ssb-SubcarrierOffset is the index of the reserved codepoint in ssb-SubcarrierOffset (taking value from {0, 1, 2, 3}), and pdcch-ConfigSIB1 is taking value from {0, 1, . . . , 254, 255}.

In another sub-embodiment, the relative location to the sync raster with an SS/PBCH block detected is measured by the number of sync rasters (i.e., GSCN values), where the number can be either positive or negative to define the relative location on either side of the SS/PBCH block. In one example, one code-point defining the "0" relative location of the next SS/PBCH block can indicate that within the indication capability (e.g. for a bandwidth of 255 sync rasters using the 8 bits), there is no SS/PBCH sync with RMSI associated, and the UE can skip all the sync rasters within the table and continue to perform blind search on the remaining sync rasters.

In one example, more code-points can indicate no such cell-defining SS/PBCH block within a range, where the range is given by GSCN index (e.g. starting and ending GSCN).

TABLE 3

| pdcch-ConfigSIB1 (e.g. 8 bits) | |
| --- | --- |
| Configuration index in pdcch-ConfigSIB1 | GSCN for cell-defining SS/PBCH block |
| 0 | No cell-defining SS/PBCH block in the search range |
| 1 | GSCN-Current + 1 |
| 2 | GSCN-Current + 2 |
| ... | ... |
| 127 | GSCN-Current + 127 |
| 128 | GSCN-Current − 1 |
| 129 | GSCN-Current − 2 |
| ... | ... |
| 255 | GSCN-Current − 128 |

In TABLE 3, GSCN-Current is the GSCN value for the current SS/PBCH block that is indicated no RMSI presents. In initial cell selection, a UE may assume no associated RMSI presents if the higher layer parameter ssb-SubcarrierOffset takes the value from {r_0, r_1, r_2, r_3}, and the UE may assume the mapping of pdcch-ConfigSIB1 to the GSCN of the synchronization raster that the UE may search for cell-defining SS/PBCH block within the searching band is according to TABLE 3, and the UE assumes no cell-defining SS/PBCH block in the range GSCN-Current−128 to GSCN-Current+127 if pdcch-ConfigSIB1=0.

Note that TABLE 3 can be equivalently given by a formula. In initial cell selection, a UE may assume no associated RMSI presents if the higher layer parameter ssb-SubcarrierOffset takes the value from {r_0, r_1, r_2, r_3}, which corresponds to index-reserved-ssb-SubcarrierOffset taking value of {0, 1, 2, 3}, respectively, and the UE may assume the GSCN of the synchronization raster that the UE may search for cell-defining SS/PBCH block within the searching band is calculated according to GSCN-cell-defined-SSB=GSCN-Current+pdcch-ConfigSIB1, when 0<pdcch-ConfigSIB1<128; GSCN-cell-defined-SSB=GSCN-Current−pdcch-ConfigSIB1, when pdcch-ConfigSIB1>128; and the UE assumes no cell-defining SS/PBCH block in the range GSCN-Current−128 to GSCN-Current+127 if pdcch-ConfigSIB1=0 where GSCN-cell-defined-SSB is the GSCN for the next cell-defined SS/PBCH block, GSCN-Current is the GSCN value for the current SS/PBCH block that is indicated no RMSI presents, index-reserved-ssb-SubcarrierOffset is the index of the reserved codepoint in ssb-SubcarrierOffset (taking value from {0, 1, 2, 3}), and pdcch-ConfigSIB1 is taking value from {0, 1, . . . , 254, 255}.

TABLE 4A

| pdcch-ConfigSIB1 (e.g. 8 bits) together with reserved codepoint in ssb-SubcarrierOffset | | |
| --- | --- | --- |
| Reserved codepoint in ssb-SubcarrierOffset | Configuration index in pdcch-ConfigSIB1 | GSCN for cell-defining SS/PBCH block |
| r_0 | 0 | No cell-defining SS/PBCH block in the search range |
| r_0 | 1 | GSCN-Current + 1 |
| r_0 | 2 | GSCN-Current + 2 |
| ... | ... | ... |
| r_0 | i | GSCN-Current + i |
| ... | ... | ... |
| r_0 | 255 | GSCN-Current + 255 |
| r_1 | 0 | GSCN-Current + 256 |
| r_1 | 1 | GSCN-Current + 257 |
| ... | ... | ... |
| r_1 | j | GSCN-Current + 256 + j |
| ... | ... | ... |
| r_1 | 255 | GSCN-Current + 511 |
| r_2 | 0 | GSCN-Current − 1 |
| ... | ... | ... |
| r_2 | k | GSCN-Current − 1 − k |
| ... | ... | ... |
| r_2 | 255 | GSCN-Current − 256 |
| r_3 | 0 | GSCN-Current − 257 |
| ... | ... | ... |
| r_3 | 255 | GSCN-Current − 512 |

In TABLE 4A, GSCN-Current is the GSCN value for the current SS/PBCH block that is indicated no RMSI presents. In initial cell selection, a UE may assume no associated RMSI presents if the higher layer parameter ssb-SubcarrierOffset takes the value from {r_0, r_1, r_2, r_3}, and the UE may assume the mapping of ssb-SubcarrierOffset and pdcch-ConfigSIB1 to the GSCN of the synchronization raster that the UE may search for cell-defining SS/PBCH block within the searching band is according to TABLE 4A, and UE assumes no cell-defining SS/PBCH block in the range GSCN-Current−512 to GSCN-Current+511 if {ssb-SubcarrierOffset, pdcch-ConfigSIB1}={r_0, 0}.

Note that TABLE 4A can be equivalently given by a formula. In initial cell selection, a UE may assume no associated RMSI presents if the higher layer parameter ssb-SubcarrierOffset takes the value from {r_0, r_1, r_2, r_3}, which corresponds to index-reserved-ssb-SubcarrierOffset taking value of {0, 1, 2, 3}, respectively, and the UE may assume the GSCN of the synchronization raster that the UE may search for cell-defining SS/PBCH block within the searching band is calculated according to GSCN-cell-defined-SSB=GSCN-Current+256*index-reserved-ssb-SubcarrierOffset+pdcch-ConfigSIB1, when reserved-ssb-SubcarrierOffset<2 and {index-reserved-ssb-SubcarrierOffset, pdcch-ConfigSIB1}≠{0, 0}; GSCN-cell-defined-SSB=GSCN-Current−256*(index-reserved-ssb-SubcarrierOffset−2)−pdcch-ConfigSIB1, when index-reserved-ssb-SubcarrierOffset>1; and the UE assumes no cell-defining SS/PBCH block in the range GSCN-Current−512 to GSCN-Current+511 if {index-reserved-ssb-SubcarrierOffset, pdcch-ConfigSIB1}={0, 0}, where GSCN-cell-defined-SSB is the GSCN for the next cell-defined SS/PBCH block, GSCN-Current is the GSCN value for the current SS/PBCH block that is indicated no RMSI presents, index-reserved-ssb-SubcarrierOffset is the index of the reserved codepoint in ssb-SubcarrierOffset (taking value from {0, 1, 2, 3}), and pdcch-ConfigSIB1 is taking value from {0, 1, . . . , 254, 255}.

TABLE 4B pdcch-ConfigSIB1 (e.g. 8 bits) together with reserved codepoint in ssb-SubcarrierOffset and one of the reserved bit utilized for indicating the MSB of subcarrier offset in FR1 (e.g. $\bar{a}_{\bar{A}+5}$) to indicate for FR1

| $\bar{a}_{\bar{A}+5}$ | ssb-SubcarrierOffset | pdcch-ConfigSIB1 | GSCN for cell-defining SS/PBCH block |
|---|---|---|---|
| 0 | 12 (or r_0) | 0 | GSCN-cell-defined-SSB = GSCN-Current + 1 |
| ... | ... | ... | ... |
| 0 | 12 (or r_0) | 255 | GSCN-cell-defined-SSB = GSCN-Current + 256 |
| 0 | 13 (or r_1) | 0 | GSCN-cell-defined-SSB = GSCN-Current − 1 |
| ... | ... | ... | ... |
| 0 | 13 (or r_1) | 255 | GSCN-cell-defined-SSB = GSCN-Current − 256 |
| 0 | 14 (or r_2) | 0 | No cell defined SSB from GSCN-Current − $\lfloor(512*\bar{a}_{\bar{A}+5} + 256*(\text{ssb-SubcarrierOffset}-14) + \text{pdcch-ConfigSIB1})/32\rfloor$ to GSCN-Current + $(512*\bar{a}_{\bar{A}+5} + 256*(\text{ssb-SubcarrierOffset}-14) + \text{pdcch-ConfigSIB1})$ mod 32 |
| ... | ... | ... | ... |
| 0 | 14 (or r_2) | 255 | No cell defined SSB from GSCN-Current − $\lfloor(512*\bar{a}_{\bar{A}+5} + 256*(\text{ssb-SubcarrierOffset}-14) + \text{pdcch-ConfigSIB1})/32\rfloor$ to GSCN-Current + $(512*\bar{a}_{\bar{A}+5} + 256*(\text{ssb-SubcarrierOffset}-14) + \text{pdcch-ConfigSIB1})$ mod 32 |
| 0 | 15 (or r_3) | 0 | No cell defined SSB from GSCN-Current − $\lfloor(512*\bar{a}_{\bar{A}+5} + 256*(\text{ssb-SubcarrierOffset}-14) + \text{pdcch-ConfigSIB1})/32\rfloor$ to GSCN-Current + $(512*\bar{a}_{\bar{A}+5} + 256*(\text{ssb-SubcarrierOffset}-14) + \text{pdcch-ConfigSIB1})$ mod 32 |
| ... | ... | ... | ... |
| 0 | 15 (or r_3) | 255 | No cell defined SSB from GSCN-Current − $\lfloor(512*\bar{a}_{\bar{A}+5} + 256*(\text{ssb-SubcarrierOffset}-14) + \text{pdcch-ConfigSIB1})/32\rfloor$ to GSCN-Current + $(512*\bar{a}_{\bar{A}+5} + 256*(\text{ssb-SubcarrierOffset}-14) + \text{pdcch-ConfigSIB1})$ mod 32 |
| 1 | 12 (or r_0) | 0 | GSCN-cell-defined-SSB = GSCN-Current + 257 |
| ... | ... | ... | ... |
| 1 | 12 (or r_0) | 255 | GSCN-cell-defined-SSB = GSCN-Current + 512 |
| 1 | 13 (or r_1) | 0 | GSCN-cell-defined-SSB = GSCN-Current − 257 |
| ... | ... | ... | ... |
| 1 | 13 (or r_1) | 255 | GSCN-cell-defined-SSB = GSCN-Current − 512 |
| 1 | 14 (or r_2) | 0 | No cell defined SSB from GSCN-Current − $\lfloor(512*\bar{a}_{\bar{A}+5} + 256*(\text{ssb-SubcarrierOffset}-14) + \text{pdcch-ConfigSIB1})/32\rfloor$ to GSCN-Current + $(512*\bar{a}_{\bar{A}+5} + 256*(\text{ssb-SubcarrierOffset}-14) + \text{pdcch-ConfigSIB1})$ mod 32 |
| ... | ... | ... | ... |
| 1 | 14 (or r_2) | 255 | No cell defined SSB from GSCN-Current − $\lfloor(512*\bar{a}_{\bar{A}+5} + 256*(\text{ssb-SubcarrierOffset}-14) + \text{pdcch-ConfigSIB1})/32\rfloor$ to GSCN-Current + $(512*\bar{a}_{\bar{A}+5} + 256*(\text{ssb-SubcarrierOffset}-14) + \text{pdcch-ConfigSIB1})$ mod 32 |
| 1 | 15 (or r_3) | 0 | No cell defined SSB from GSCN-Current − No cell defined SSB from GSCN-Current − $\lfloor(512*\bar{a}_{\bar{A}+5} + 256*(\text{ssb-SubcarrierOffset}-14) + \text{pdcch-ConfigSIB1})/32\rfloor$ to GSCN-Current + $(512*\bar{a}_{\bar{A}+5} + 256*(\text{ssb-SubcarrierOffset}-14) + \text{pdcch-ConfigSIB1})$ mod 32 |
| ... | ... | ... | ... |
| 1 | 15 (or r_3) | 255 | No cell defined SSB from GSCN-Current − $\lfloor(512*\bar{a}_{\bar{A}+5} + 256*(\text{ssb-SubcarrierOffset}-14) + \text{pdcch-ConfigSIB1})/32\rfloor$ to GSCN-Current + $(512*\bar{a}_{\bar{A}+5} + 256*(\text{ssb-SubcarrierOffset}-14) + \text{pdcch-ConfigSIB1})$ mod 32 |

TABLE 4C pdcch-ConfigSIB1 (e.g. 8 bits) together with reserved
codepoint in ssb-SubcarrierOffset to indicate for FR2

| ssb-SubcarrierOffset | pdcch-ConfigSIB1 | GSCN for cell-defining SS/PBCH block |
|---|---|---|
| 12 (or r_0) | 0 | GSCN-cell-defined-SSB = GSCN-Current + 1 |
| ... | ... | ... |
| 12 (or r_0) | 255 | GSCN-cell-defined-SSB = GSCN-Current + 256 |
| 13 (or r_1) | 0 | GSCN-cell-defined-SSB = GSCN-Current − 1 |
| ... | ... | ... |
| 13 (or r_1) | 255 | GSCN-cell-defined-SSB = GSCN-Current − 256 |
| 14 (or r_2) | 0 | No cell defined SSB from GSCN-Current − $\lfloor(256*(ssb\text{-}SubcarrierOffset\text{-}14) + pdcch\text{-}ConfigSIB1)/32\rfloor$ to GSCN-Current + $(256*(ssb\text{-}SubcarrierOffset\text{-}14) + pdcch\text{-}ConfigSIB1)$ mod 32 |
| ... | ... | ... |
| 14 (or r_2) | 255 | No cell defined SSB from GSCN-Current − $\lfloor(256*(ssb\text{-}SubcarrierOffset\text{-}14) + pdcch\text{-}ConfigSIB1)/32\rfloor$ to GSCN-Current + $(256*(ssb\text{-}SubcarrierOffset\text{-}14) + pdcch\text{-}ConfigSIB1)$ mod 32 |
| 15 (or r_3) | 0 | No cell defined SSB from GSCN-Current − $\lfloor(256*(ssb\text{-}SubcarrierOffset\text{-}14) + pdcch\text{-}ConfigSIB1)/32\rfloor$ to GSCN-Current + $(256*(ssb\text{-}SubcarrierOffset\text{-}14) + pdcch\text{-}ConfigSIB1)$ mod 32 |
| ... | ... | ... |
| 15 (or r_3) | 255 | No cell defined SSB from GSCN-Current − $\lfloor(256*(ssb\text{-}SubcarrierOffset\text{-}14) + pdcch\text{-}ConfigSIB1)/32\rfloor$ to GSCN-Current + $(256*(ssb\text{-}SubcarrierOffset\text{-}14) + pdcch\text{-}ConfigSIB1)$ mod 32 |

In TABLES 4B and 4C, GSCN-Current is the GSCN value for the current SS/PBCH block that is indicated no RMSI presents. In initial cell selection, a UE may assume no associated RMSI presents if the higher layer parameter ssb-SubcarrierOffset takes the value from {12, 13, 14, 15} (or equivalently {r_0, r_1, r_2, r_3}), and the UE may assume the mapping of ssb-SubcarrierOffset, $\bar{a}_{\bar{A}+5}$ (for FR1 only) and pdcch-ConfigSIB1 to the GSCN of the synchronization raster that the UE may search for cell-defining SS/PBCH block within the searching band is according to TABLES 4B and 4C, and UE assumes no cell-defining SS/PBCH block in the given range if ssb-SubcarrierOffset=14 or 15.

Note that TABLES 4B and 4C can be equivalently given by a formula. In initial cell selection, a UE may assume no associated RMSI presents if the higher layer parameter ssb-SubcarrierOffset takes the value from {12, 13, 14, 15} (or equivalently {r_0, r_1, r_2, r_3}), and the UE may assume the GSCN of the synchronization raster that the UE may search for cell-defining SS/PBCH block within the searching band is calculated according to GSCN-cell-defined-SSB=GSCN-Current+256*$a_{SSB}$ pdcch-ConfigSIB1+1, when ssb-SubcarrierOffset=12; GSCN-cell-defined-SSB=GSCN-Current−256*$a_{SSB}$−pdcch-ConfigSIB1−1, when ssb-SubcarrierOffset=13; and the UE assumes no cell-defining SS/PBCH block in the range from GSCN-Current−$\lfloor(512*a_{SSB}+256*(ssb\text{-}SubcarrierOffset\text{-}14)+pdcch\text{-}ConfigSIB1)/32\rfloor$ to GSCN-Current+$(512*a_{SSB}+256*(ssb\text{-}SubcarrierOffset\text{-}14)+pdcch\text{-}ConfigSIB1)$ mod 32 if ssb-SubcarrierOffset=14 or 15, where GSCN-cell-defined-SSB is the GSCN for the next cell-defined SS/PBCH block, GSCN-Current is the GSCN value for the current SS/PBCH block that is indicated no RMSI presents, $a_{SSB}$ is $\bar{a}_{\bar{A}+5}$ for FR1 and 0 for FR2, ssb-SubcarrierOffset is taking value from {12, 13, 14, 15}, and pdcch-ConfigSIB1 is taking value from {0, 1, ..., 254, 255}.

TABLE 4D pdcch-ConfigSIB1 (e.g. 8 bits) together with reserved codepoint in ssb-SubcarrierOffset
and one of the reserved bit utilized for indicating the MSB of subcarrier offset in
FR1 (e.g. $\bar{a}_{\bar{A}+5}$) to indicate for FR1

| $\bar{a}_{\bar{A}+5}$ | ssb-SubcarrierOffset | pdcch-ConfigSIB1 | GSCN for cell-defining SS/PBCH block |
|---|---|---|---|
| 1 | 8 | 0 | GSCN-cell-defined-SSB = GSCN-Current + 1 |
| ... | ... | ... | ... |
| 1 | 8 | 255 | GSCN-cell-defined-SSB = GSCN-Current + 256 |
| 1 | 9 | 0 | GSCN-cell-defined-SSB = GSCN-Current + 257 |
| ... | ... | ... | ... |

TABLE 4D-continued pdcch-ConfigSIB1 (e.g. 8 bits) together with reserved codepoint in ssb-SubcarrierOffset and one of the reserved bit utilized for indicating the MSB of subcarrier offset in FR1 (e.g. $\bar{a}_{\bar{A}+5}$) to indicate for FR1

| $\bar{a}_{\bar{A}+5}$ | ssb-SubcarrierOffset | pdcch-ConfigSIB1 | GSCN for cell-defining SS/PBCH block |
|---|---|---|---|
| 1 | 9 | 255 | GSCN-cell-defined-SSB = GSCN-Current + 512 |
| 1 | 10 | 0 | GSCN-cell-defined-SSB = GSCN-Current + 513 |
| ... | ... | ... | ... |
| 1 | 10 | 255 | GSCN-cell-defined-SSB = GSCN-Current + 768 |
| 1 | 11 | 0 | GSCN-cell-defined-SSB = GSCN-Current − 1 |
| ... | ... | ... | ... |
| 1 | 11 | 255 | GSCN-cell-defined-SSB = GSCN-Current − 256 |
| 1 | 12 | 0 | GSCN-cell-defined-SSB = GSCN-Current − 257 |
| ... | ... | ... | ... |
| 1 | 12 | 255 | GSCN-cell-defined-SSB = GSCN-Current − 512 |
| 1 | 13 | 0 | GSCN-cell-defined-SSB = GSCN-Current − 513 |
| ... | ... | ... | ... |
| 1 | 13 | 255 | GSCN-cell-defined-SSB = GSCN-Current − 768 |
| 1 | 14 | 0 | Reserved |
| ... | ... | ... | Reserved |
| 1 | 14 | 255 | Reserved |
| 1 | 15 | 0 | No cell defined SSB from GSCN-Current − ⌊pdcch-ConfigSIB1/16⌋ to GSCN-Current + pdcch-ConfigSIB1 mod 16 |
| ... | ... | ... | ... |
| 1 | 15 | 255 | No cell defined SSB from GSCN-Current − ⌊pdcch-ConfigSIB1/16⌋ to GSCN-Current + pdcch-ConfigSIB1 mod 16 |

TABLE 4E using pdcch-ConfigSIB1 (e.g. 8 bits) together with reserved codepoint in ssb-SubcarrierOffset to indicate for FR2

| ssb-SubcarrierOffset | pdcch-ConfigSIB1 | GSCN for cell-defining SS/PBCH block |
|---|---|---|
| 12 | 0 | GSCN-cell-defined-SSB = GSCN-Current + 1 |
| ... | ... | ... |
| 12 | 255 | GSCN-cell-defined-SSB = GSCN-Current + 256 |
| 13 | 0 | GSCN-cell-defined-SSB = GSCN-Current − 1 |
| ... | ... | ... |
| 13 | 255 | GSCN-cell-defined-SSB = GSCN-Current − 256 |
| 14 | 0 | Reserved |
| ... | ... | ... |
| 14 | 255 | Reserved |
| 15 | 0 | No cell defined SSB from GSCN-Current − ⌊pdcch-ConfigSIB1/16⌋ to GSCN-Current + pdcch-ConfigSIB1 mod 16 |
| ... | ... | ... |
| 15 | 255 | No cell defined SSB from GSCN-Current − ⌊pdcch-ConfigSIB1/16⌋ to GSCN-Current + pdcch-ConfigSIB1 mod 16 |

In TABLES 4D and 4E, GSCN-Current is the GSCN value for the current SS/PBCH block that is indicated no RMSI presents. In initial cell selection, a UE may assume no associated RMSI presents if the higher layer parameter ssb-SubcarrierOffset takes the value from {12, 13, 14, 15} for FR2 or takes the value {8, 9, 10, 11, 12, 13, 14, 15} with $\bar{a}_{\bar{A}+5}$=1 for FR1 (equivalently as k_SSB takes value from {12, 13, 14, 15} for FR2 and from {24, 25, 26, 27, 28, 29, 30, 31} for FR1 respectively), and the UE may assume the mapping of ssb-SubcarrierOffset, $\bar{a}_{\bar{A}+5}$ (for FR1 only) and pdcch-ConfigSIB1 to the GSCN of the synchronization raster that the UE may search for cell-defining SS/PBCH block within the searching band is according to TABLES 4D and 4E, and the UE assumes no cell-defining SS/PBCH block in the given range GSCN-Current−⌊pdcch-ConfigSIB1/16⌋ to GSCN-Current+pdcch-ConfigSIB1 mod 16 if ssb-SubcarrierOffset=15 for FR2 and ssb-SubcarrierOffset=15 and $\bar{a}_{\bar{A}+5}=1$ for FR1.

Note that TABLES 4D and 4E can be equivalently given by a formula. In initial cell selection, a UE may assume no associated RMSI presents if the higher layer parameter ssb-SubcarrierOffset takes the value from {12, 13, 14, 15} for FR2 or takes the value {8, 9, 10, 11, 12, 13, 14, 15} with $\bar{a}_{\bar{A}+5}=1$ for FR1 (equivalently as k_SSB takes value from {12, 13, 14, 15} for FR2 and from {24, 25, 26, 27, 28, 29, 30, 31} for FR1 respectively), and the UE may assume the GSCN of the synchronization raster that the UE may search for cell-defining SS/PBCH block within the searching band is calculated according to for FR1 GSCN-cell-defined-SSB=GSCN-Current+256*(ssb-SubcarrierOffset−8)+pdcch-ConfigSIB1+1, when $\bar{a}_{\bar{A}+5}=1$ and ssb-SubcarrierOffset=8, or 9, or 10; GSCN-cell-defined-SSB=GSCN-Current−256*(ssb-SubcarrierOffset−11)−pdcch-ConfigSIB1−1, when $\bar{a}_{\bar{A}+5}=1$ and ssb-SubcarrierOffset=11, or 12, or 13; for FR2 GSCN-cell-defined-SSB=GSCN-Current+pdcch-ConfigSIB1+1, when ssb-SubcarrierOffset=12; GSCN-cell-defined-SSB=GSCN-Current−pdcch-ConfigSIB1−1, when ssb-SubcarrierOffset=13; and the UE assumes no cell-defining SS/PBCH block in the given range GSCN-Current−⌊pdcch-ConfigSIB1/16⌋ to GSCN-Current+pdcch-ConfigSIB1 mod 16 if ssb-SubcarrierOffset=15 for FR2 and ssb-SubcarrierOffset=15 and $\bar{a}_{\bar{A}+5}=1$ for FR1, where GSCN-cell-defined-SSB is the GSCN for the next cell-defined SS/PBCH block, GSCN-Current is the GSCN value for the current SS/PBCH block that is indicated no RMSI presents. Note that a special case is, when pdcch-ConfigSIB1=0, the given range is equivalent as a single GSCN point GSCN-Current, and that the UE assumes no cell-defined SS/PBCH block at GSCN-Current is equivalent as no further information of the next cell-defined SS/PBCH block.

TABLE 4F pdcch-ConfigSIB1 (e.g. 8 bits) together with reserved codepoint in ssb-SubcarrierOffset and one of the reserved bit utilized for indicating the MSB of subcarrier offset in FR1 (e.g. $\bar{a}_{\bar{A}+5}$) to indicate for FR1

| $\bar{a}_{\bar{A}+5}$ | ssb-SubcarrierOffset | pdcch-ConfigSIB1 | GSCN for cell-defining SS/PBCH block |
|---|---|---|---|
| 0 | 12 (or r__0) | 0 | GSCN-cell-defined-SSB = GSCN-Current + 1 |
| ... | ... | ... | ... |
| 0 | 12 (or r__0) | 255 | GSCN-cell-defined-SSB = GSCN-Current + 256 |
| 0 | 13 (or r__1) | 0 | GSCN-cell-defined-SSB = GSCN-Current + 257 |
| ... | ... | ... | ... |
| 0 | 13 (or r__1) | 255 | GSCN-cell-defined-SSB = GSCN-Current + 512 |
| 0 | 14 (or r__2) | 0 | GSCN-cell-defined-SSB = GSCN-Current + 513 |
| ... | ... | ... | ... |
| 0 | 14 (or r__2) | 255 | GSCN-cell-defined-SSB = GSCN-Current + 768 |
| 0 | 15 (or r__3) | 0 | No cell defined SSB from GSCN-Current − ⌊($\bar{a}_{\bar{A}+5}$ *256 + pdcch-ConfigSIB1)/32⌋ to GSCN-Current + ($\bar{a}_{\bar{A}+5}$ *256 + pdcch-ConfigSIB1) mod 32 |
| ... | ... | ... | ... |
| 0 | 15 (or r__3) | 255 | No cell defined SSB from GSCN-Current − ⌊($\bar{a}_{\bar{A}+5}$ *256 + pdcch-ConfigSIB1)/32⌋ to GSCN-Current + ($\bar{a}_{\bar{A}+5}$ *256 + pdcch-ConfigSIB1) mod 32 |
| 1 | 12 (or r__0) | 0 | GSCN-cell-defined-SSB = GSCN-Current − 1 |
| ... | ... | ... | ... |
| 1 | 12 (or r__0) | 255 | GSCN-cell-defined-SSB = GSCN-Current − 256 |
| 1 | 13 (or r__1) | 0 | GSCN-cell-defined-SSB = GSCN-Current − 257 |
| ... | ... | ... | ... |
| 1 | 13 (or r__1) | 255 | GSCN-cell-defined-SSB = GSCN-Current − 512 |
| 1 | 14 (or r__2) | 0 | GSCN-cell-defined-SSB = GSCN-Current − 513 |
| ... | ... | ... | ... |
| 1 | 14 (or r__2) | 255 | GSCN-cell-defined-SSB = GSCN-Current − 768 |
| 1 | 15 (or r__3) | 0 | No cell defined SSB from GSCN-Current − ⌊($\bar{a}_{\bar{A}+5}$ *256 + pdcch-ConfigSIB1)/32⌋ to GSCN-Current + ($\bar{a}_{\bar{A}+5}$ *256 + pdcch-ConfigSIB1) mod 32 |
| ... | ... | ... | ... |
| 1 | 15 (or r__3) | 255 | No cell defined SSB from GSCN-Current − ⌊($\bar{a}_{\bar{A}+5}$ *256 + pdcch-ConfigSIB1)/32⌋ to GSCN-Current + ($\bar{a}_{\bar{A}+5}$ *256 + pdcch-ConfigSIB1) mod 32 |

TABLE 4G pdcch-ConfigSIB1 (e.g. 8 bits) together with reserved codepoint in ssb-SubcarrierOffset to indicate for FR2

| ssb-SubcarrierOffset | pdcch-ConfigSIB1 | GSCN for cell-defining SS/PBCH block |
|---|---|---|
| 12 (or r_0) | 0 | GSCN-cell-defined-SSB = GSCN-Current + 1 |
| . . . | . . . | . . . |
| 12 (or r_0) | 255 | GSCN-cell-defined-SSB = GSCN-Current + 256 |
| 13 (or r_1) | 0 | GSCN-cell-defined-SSB = GSCN-Current − 1 |
| . . . | . . . | . . . |
| 13 (or r_1) | 255 | GSCN-cell-defined-SSB = GSCN-Current − 256 |
| 14 (or r_2) | 0 | No cell defined SSB from GSCN-Current − ⌊((ssb-SubcarrierOffset-14)*256 + pdcch-ConfigSIB1)/32⌋ to GSCN-Current + ((ssb-SubcarrierOffset-14)*256 + pdcch-ConfigSIB1) mod 32 |
| . . . | . . . | . . . |
| 14 (or r_2) | 255 | No cell defined SSB from GSCN-Current − ⌊((ssb-SubcarrierOffset-14)*256 + pdcch-ConfigSIB1)/32⌋ to GSCN-Current + ((ssb-SubcarrierOffset-14)*256 + pdcch-ConfigSIB1) mod 32 |
| 15 (or r_3) | 0 | No cell defined SSB from GSCN-Current − ⌊((ssb-SubcarrierOffset-14)*256 + pdcch-ConfigSIB1)/32⌋ to GSCN-Current + ((ssb-SubcarrierOffset-14)*256 + pdcch-ConfigSIB1) mod 32 |
| . . . | . . . | . . . |
| 15 (or r_3) | 255 | No cell defined SSB from GSCN-Current − ⌊((ssb-SubcarrierOffset-14)*256 + pdcch-ConfigSIB1)/32⌋ to GSCN-Current + ((ssb-SubcarrierOffset-14)*256 + pdcch-ConfigSIB1) mod 32 |

In TABLES 4F and 4G, GSCN-Current is the GSCN value for the current SS/PBCH block that is indicated no RMSI presents. In initial cell selection, a UE may assume no associated RMSI presents if the higher layer parameter ssb-SubcarrierOffset takes the value from {12, 13, 14, 15} (or equivalently {r_0, r_1, r_2, r_3}), and the UE may assume the mapping of ssb-SubcarrierOffset, $\bar{a}_{\bar{A}+5}$ (for FR1 only) and pdcch-ConfigSIB1 to the GSCN of the synchronization raster that the UE may search for cell-defining SS/PBCH block within the searching band is according to TABLES 4F and 4G, and UE assumes no cell-defining SS/PBCH block in the given range from GSCN-Current−⌊($\bar{a}_{\bar{A}+5}$*256+pdcch-ConfigSIB1)/32⌋ to GSCN-Current+($\bar{a}_{\bar{A}+5}$*256+pdcch-ConfigSIB1) mod 32 if ssb-SubcarrierOffset=15 for FR1, and from GSCN-Current−⌊((ssb-SubcarrierOffset−14)*256+pdcch-ConfigSIB1)/32⌋ to GSCN-Current+((ssb-SubcarrierOffset−14)*256+pdcch-ConfigSIB1) mod 32 if ssb-SubcarrierOffset=15 or 14 for FR2.

Note that TABLES 4F and 4G can be equivalently given by a formula. In initial cell selection, a UE may assume no associated RMSI presents if the higher layer parameter ssb-SubcarrierOffset takes the value from {12, 13, 14, 15} (or equivalently {r_0, r_1, r_2, r_3}), and the UE may assume the GSCN of the synchronization raster that the UE may search for cell-defining SS/PBCH block within the searching band is calculated according to for FR1 GSCN-cell-defined-SSB GSCN-Current+256*(ssb-SubcarrierOffset−12)+pdcch-ConfigSIB1+1, when $\bar{a}_{\bar{A}+5}$=0 and ssb-SubcarrierOffset=12, or 13, 14; GSCN-cell-defined-SSB=GSCN-Current−256*(ssb-SubcarrierOffset−12)−pdcch-ConfigSIB1−1, when $\bar{a}_{\bar{A}+5}$=1 and ssb-SubcarrierOffset=12, or 13, 14; for FR2 GSCN-cell-defined-SSB=GSCN-Current+pdcch-ConfigSIB1+1, when ssb-SubcarrierOffset=12; GSCN-cell-defined-SSB=GSCN-Current−pdcch-ConfigSIB1−1, when ssb-SubcarrierOffset=13; and the UE assumes no cell-defining SS/PBCH block in the given range from GSCN-Current−⌊(a*256+pdcch-ConfigSIB1)/32⌋ to GSCN-Current (a*256+pdcch-ConfigSIB1) mod 32 if ssb-SubcarrierOffset=15 for FR1, and ssb-SubcarrierOffset=15 or 14 for FR2, where a=$\bar{a}_{\bar{A}+5}$ for FR1 and a=(ssb-SubcarrierOffset−14) for FR2, and GSCN-cell-defined-SSB is the GSCN for the next cell-defined SS/PBCH block, GSCN-Current is the GSCN value for the current SS/PBCH block that is indicated no RMSI presents, ssb-SubcarrierOffset is taking value from {12, 13, 14, 15}, and pdcch-ConfigSIB1 is taking value from {0, 1, . . . , 254, 255}.

In one embodiment, the 8 bits are utilized to indicate the range of frequency location where the next SS/PBCH block associated with a RMSI can be located within, wherein each of the 256 code-point represents a range of frequency location where an SS/PBCH block can be located. After decoding the 8 bits, the UE can directly go to the indicated frequency range and blindly search all the sync rasters within the indicated range if there are multiple sync rasters within the indicated range, and can directly search the indicated sync raster if there is only single sync raster within the indicated range.

In one example, in TABLE 5, for a given band, assuming the lowest carrier frequency as F_1 and the highest carrier frequency as F_2. The whole band is divided into 256 ranges of frequency locations possibly containing the sync rasters, where the interval of each range is I_F=(F_2−F_1)/255, and each of the 256 code-points represents one of the ranges of frequency locations.

TABLE 5

F_1 and F_2 can be defined as the lowest and highest
carrier frequency of the bandwidth containing sync rasters
(i.e., F_1 is the location of first sync raster for that given band,
and F_2 is the location of the last sync raster for that given band)

| Code-point Index | Range of frequency locations containing sync raster(s) |
|---|---|
| 1 | [F_1, F_1 + I_F) |
| 2 | [F_1 + I_F, F_1 + 2 * I_F) |
| ... | ... |
| 255 | [F_1 + 253 * I_F, F_1 + 254 * I_F) |
| 256 | [F_1 + 254 * I_F, F_2] |

In another example, in TABLE 6, for a given band, assuming the lowest carrier frequency as F_1, the highest carrier frequency as F_2, and the current location (on a sync raster) that UE detects an SS/PBCH block without RMSI as F_S. The remaining part of the band to search is divided into 256 ranges of frequency locations possibly containing the sync rasters, where the interval of each range is I_F=(F_2−F_c)/255 if assuming the searching order is from low to high in the frequency domain (I_F=(F_c−F_1)/255 if assuming the searching order is from high to low in the frequency domain), and each of the 256 code-points represents one of the ranges of frequency locations.

TABLE 6

F_1 and F_2 can be defined as the lowest and highest carrier
frequency of the bandwidth containing sync rasters (i.e., F_1 is the
location of first sync raster for that given band, and F_2 is the
location of the last sync raster for that given band)

| Code-point Index | Range of frequency locations containing sync raster(s) if searching order is from low to high | Range of frequency locations containing sync raster(s) if searching order is from high to low |
|---|---|---|
| 1 | [F_c, F_c + I_F) | [F_c, F_c − I_F) |
| 2 | [F_c + I_F, F_c + 2 * I_F) | [F_c − I_F, F_c − 2 * I_F) |
| ... | ... | ... |
| 255 | [F_c + 253 * I_F, F_c + 254 * I_F) | [F_c − 253 * I_F, F_c − 254 * I_F) |
| 256 | [F_c + 254 * I_F, F_2] | [F_c − 254 * I_F, F_1] |

In one embodiment, if there is only one sync raster within every indicated range (note that the divided range may not be uniform), the aforementioned embodiment is effectively equivalent as indicating the exact location of the sync raster in this band. Still, one of the codepoints can be utilized to indicate no cell-defining SS/PBCH block within the band, and the codepoint can either be a separate codepoint from the ones indicating sync raster location, or be the sync raster location corresponding to the current searching location in frequency domain (i.e., also on a sync raster).

In one sub-embodiment, if the number of sync raster exceeds 255 for one band, some reserved bits in PBCH content or some reserved codepoint from other field(s) in PBCH content can be combined with the 8 bits for RMSI CORESET configuration to obtain a larger indication range. For example, if one extra bit can be combined, the indication range can be enlarged to 511 or 512 (depending on which codepoint indicating no cell-defining SS/PBCH block in the band). For another example, if at most 4 other reserved codepoints can be combined, the indication range can be enlarged to up to 1023 or 1024 (depending on which codepoint indicating no cell-defining SS/PBCH block in the band), which may be more than sufficient for indicating the raster index within a band for NR.

In one example, another field in PBCH contend or reserved codepoint can be utilized to indicate the band number, such that if current sync raster where SS/PBCH block is not associated with RMSI is located in the overlapping bandwidth between 2 bands.

In one example, 8 bits of RMSI CORESET configuration (i.e., pdcch-ConfigSIB1) together with the reserved codepoints in ssb-SubcarrierOffset in MIB (note that there are 4 reserved codepoints in ssb-SubcarrierOffset, which can be denoted as r_0, r_1, r_2, r_3) is used as shown in TABLE 7, where GSCN-first is the first GSCN value for the currently searched band and GSCN-step-size is the step size of GSCN value for the currently searched band (e.g. the particular value of GSCN-first and GSCN-step-size for each band can be found in related wireless communication specification), and a separate codepoint is utilized to indicate no cell-defining SS/PBCH block in the currently searched band (e.g. ssb-SubcarrierOffset takes the value of r_0 and pdcch-ConfigSIB1 takes the value of 0).

In initial cell selection, a UE may assume no associated RMSI presents if the higher layer parameter ssb-SubcarrierOffset takes the value from {r_0, r_1, r_2, r_3}, and the UE may assume the mapping of ssb-SubcarrierOffset and pdcch-ConfigSIB1 to the GSCN of the synchronization raster that the UE may search for cell-defining SS/PBCH block within the searching band is according to TABLE 7. Note that the largest number of GSCN for a supported NR band is 620, which gives the determination of the indicated GSCN range as at most GSCN-first to GSCN-first+619*GSCN-step-size in TABLE 7.

If there are new bands defined in NR, the remaining reserved combination of codepoints can be utilized to further enlarge the indication range. For example, if the largest number of GSCN for a supported NR band is determined as X, the indicated GSCN range in TABLE 7 can be from GSCN-first to GSCN-first+(X−1)*GSCN-step-size. Note that the indication capability of TABLE 7 can be X up to 1023.

Also note that TABLE 7 can be equivalently given by a formula. In initial cell selection, a UE may assume no associated RMSI presents if the higher layer parameter ssb-SubcarrierOffset takes the value from {r_0, r_1, r_2, r_3}, which corresponds to index-reserved-ssb-SubcarrierOffset taking value of {0, 1, 2, 3}, respectively, and the UE may assume the GSCN of the synchronization raster that the UE may search for cell-defining SS/PBCH block within the searching band is calculated according to GSCN-cell-defined-SSB=GSCN-first+256*index-reserved-ssb-SubcarrierOffset*GSCN-step-size+(pdcch-ConfigSIB1−1)*GSCN-step-size, when {index-reserved-ssb-SubcarrierOffset, pdcch-ConfigSIB1}≠{0, 0}, and the UE assumes no cell-defining SS/PBCH block in the currently searched band if {index-reserved-ssb-SubcarrierOffset, pdcch-ConfigSIB1}={0, 0}, where GSCN-cell-defined-SSB is the GSCN for the next cell-defined SS/PBCH block within the currently searched band, GSCN-first is the first GSCN value for the currently searched band, GSCN-step-size is the step size of GSCN value for the currently searched band, index-reserved-ssb-SubcarrierOffset is the index of the reserved codepoint in ssb-SubcarrierOffset (taking value from {0, 1, 2, 3}), and pdcch-ConfigSIB1 is taking value from {0, 1, . . . , 254, 255}.

In one embodiment, GSCN-cell-defined-SSB can be limited to be smaller or equal to GSCN-first+619*GSCN-step-size at this moment and all other codepoints are reserved for forward compatibility.

TABLE 7

Indication capability

| Reserved codepoint in ssb-SubcarrierOffset | Configuration index in pdcch-ConfigSIB1 | GSCN for cell-defining SS/PBCH block |
|---|---|---|
| r_0 | 0 | No cell-defining SS/PBCH block in the currently searched band |
| r_0 | 1 | GSCN-first |
| r_0 | 2 | GSCN-first + GSCN-step-size |
| ... | ... | ... |
| r_0 | i | GSCN-first + (i − 1) * GSCN-step-size |
| ... | ... | ... |
| r_0 | 255 | GSCN-first + 254 * GSCN-step-size |
| r_1 | 0 | GSCN-first + 255 * GSCN-step-size |
| r_1 | 1 | GSCN-first + 256 * GSCN-step-size |
| ... | ... | ... |
| r_1 | j | GSCN-first + (j + 255) * GSCN-step-size |
| ... | ... | ... |
| r_1 | 255 | GSCN-first + 510 * GSCN-step-size |
| r_2 | 0 | GSCN-first + 511 * GSCN-step-size |
| ... | ... | ... |
| r_2 | k | GSCN-first + (k + 511) * GSCN-step-size |
| ... | ... | ... |
| r_2 | 108 | GSCN-first + 619 * GSCN-step-size |
| r_2 | 109 | Reserved |
| ... | ... | ... |
| r_2 | 255 | Reserved |
| r_3 | 0 | Reserved |
| ... | ... | ... |
| r_3 | 255 | Reserved |

In another example using 8 bits of RMSI CORESET configuration (i.e., pdcch-ConfigSIB1) together with the reserved codepoints in ssb-SubcarrierOffset in MIB (note that there are 4 reserved codepoints in ssb-SubcarrierOffset, which can be denoted as r_0, r_1, r_2, r_3), is shown in TABLE 8, where GSCN-first is the first GSCN value for the currently searched band and GSCN-step-size is the step size of GSCN value for the currently searched band (e.g. the particular value of GSCN-first and GSCN-step-size for each band can be found in related wireless communication specification), and no separate codepoint is utilized to indicate no cell-defining SS/PBCH block in the currently searched band since the codepoint corresponding to the GSCN of currently located SS/PBCH block is utilized to indicate cell-defining SS/PBCH block in the currently searched band.

In initial cell selection, a UE may assume no associated RMSI presents if the higher layer parameter ssb-SubcarrierOffset takes the value from {r_0, r_1, r_2, r_3}, and the UE may assume the mapping of ssb-SubcarrierOffset and pdcch-ConfigSIB1 to the GSCN of the synchronization raster that the UE may search for cell-defining SS/PBCH block within the searching band is according to TABLE 8.

The UE assumes no cell-defining SS/PBCH block in the currently searched band, if the GSCN for cell-defining SS/PBCH block determined by TABLE 8 equals to the GSCN of current SS/PBCH block. Note that the largest number of GSCN for a supported NR band is 620, which gives the determination of the indicated GSCN range as at most GSCN-first to GSCN-first+619*GSCN-step-size in TABLE 8.

If there are new bands defined in NR, the remaining reserved combination of codepoints can be utilized to further enlarge the indication range. For example, if the largest number of GSCN for a supported NR band is determined as X, the indicated GSCN range in TABLE 8 can be from GSCN-first to GSCN-first+(X−1)*GSCN-step-size. Note that the indication capability of TABLE 8 can be X up to 1024. Also note that TABLE 8 can be equivalently given by a formula.

In initial cell selection, a UE may assume no associated RMSI presents if the higher layer parameter ssb-SubcarrierOffset takes the value from {r_0, r_1, r_2, r_3}, which corresponds to index-reserved-ssb-SubcarrierOffset taking value of {0, 1, 2, 3}, respectively, and the UE may assume the GSCN of the synchronization raster that the UE may search for cell-defining SS/PBCH block within the searching band is calculated according to GSCN-cell-defined-SSB=GSCN-first+256*index-reserved-ssb-SubcarrierOffset*GSCN-step-size+pdcch-ConfigSIB1*GSCN-step-size, and the UE assumes no cell-defining SS/PBCH block in the currently searched band if GSCN-cell-defined-SSB equals to the GSCN of current SS/PBCH block, where GSCN-cell-defined-SSB is the GSCN for the next cell-defined SS/PBCH block within the currently searched band, GSCN-first is the first GSCN value for the currently searched band, GSCN-step-size is the step size of GSCN value for the currently searched band, index-reserved-ssb-SubcarrierOffset is the index of the reserved codepoint in ssb-SubcarrierOffset (taking value from {0, 1, 2, 3}), and pdcch-ConfigSIB1 is taking value from {0, 1, . . . , 254, 255}. In one embodiment, GSCN-cell-defined-SSB can be limited to be smaller or equal to GSCN-first+ 619*GSCN-step-size at this moment and all other codepoints are reserved for forward compatibility.

TABLE 8

Indication capability

| Reserved codepoint in ssb-SubcarrierOffset | Configuration index in pdcch-ConfigSIB1 | GSCN for cell-defining SS/PBCH block |
|---|---|---|
| r_0 | 0 | GSCN-first |
| r_0 | 1 | GSCN-first + GSCN-step-size |
| ... | ... | ... |
| r_0 | i | GSCN-first + i * GSCN-step-size |
| ... | ... | ... |
| r_0 | 255 | GSCN-first + 255 * GSCN-step-size |
| r_1 | 0 | GSCN-first + 256 * GSCN-step-size |
| r_1 | 1 | GSCN-first + 257 * GSCN-step-size |
| ... | ... | ... |
| r_1 | j | GSCN-first + (j + 256) * GSCN-step-size |
| ... | ... | ... |
| r_1 | 255 | GSCN-first + 511 * GSCN-step-size |
| r_2 | 0 | GSCN-first + 512 * GSCN-step-size |
| ... | ... | ... |
| r_2 | k | GSCN-first + (k + 512) * GSCN-step-size |
| ... | ... | ... |
| r_2 | 107 | GSCN-first + 619 * GSCN-step-size |
| r_2 | 108 | Reserved |
| ... | ... | ... |

TABLE 8-continued

Indication capability

| Reserved codepoint in ssb-SubcarrierOffset | Configuration index in pdcch-ConfigSIB1 | GSCN for cell-defining SS/PBCH block |
|---|---|---|
| r_2 | 255 | Reserved |
| r_3 | 0 | Reserved |
| ... | ... | ... |
| r_3 | 255 | Reserved |

In one embodiment, the field in PBCH payload is utilized to indicate the bitmap of the ranges of frequency location or carrier where the SS/PBCH block(s) associated with a RMSI can be located within. After decoding the field in PBCH payload, the UE can find all the ranges of frequency location where the SS/PBCH block(s) associated with a RMSI can be located within. The UE can choose one of the indicated location ranges (e.g. denoted as "1" in the bitmap for that frequency range) and blindly search all the sync rasters within the indicated range.

For one example, assuming the lowest carrier frequency as $F\_1$ and the highest carrier frequency as $F\_2$. The whole band is divided into N ranges of frequency locations possibly containing the sync rasters $[F\_1, F\_1+I\_F)$, $[F\_1+I\_F, F\_1+2*I\_F)$, ..., $[F\_1+(N-1)*I\_F, F\_2]$, where the interval of each range is $I\_F=(F\_2-F\_1)/(N-1)$, and each of the $2^N$ code-points represents a bitmap indicating which of the N ranges containing SS/PBCH blocks with RMSI. TABLE 9A shows an example of N=8. TABLE 9B shows an example of N=4.

TABLE 9A

N = 8, F_1 and F_2 can be defined as the lowest and highest carrier frequency of the bandwidth containing sync rasters (i.e., F_1 is the location of first sync raster for that given band, and F_2 is the location of the last sync raster for that given band)

| Code-point Index | Bitmap indicating the ranges of frequency locations containing sync raster(s) |
|---|---|
| 1 | 00000000 |
| 2 | 00000001 |
| ... | ... |
| 255 | 11111110 |
| 256 | 11111111 |

TABLE 9B

N = 4, F_1 and F_2 can be defined as the lowest and highest carrier frequency of the bandwidth containing sync rasters (i.e., F_1 is the location of first sync raster for that given band, and F_2 is the location of the last sync raster for that given band)

| Code-point Index | Bitmap indicating the ranges of frequency locations containing sync raster(s) |
|---|---|
| 1 | 0000 |
| 2 | 0001 |
| ... | ... |
| 15 | 1110 |
| 16 | 1111 |

In another example, assuming the lowest carrier frequency as $F\_1$, the highest carrier frequency as $F\_2$, and the current location (on a sync raster) that UE detects an SS/PBCH block without RMSI as $F\_S$. The remaining part of the band to search is divided into N ranges of frequency locations possibly containing the sync rasters $[F\_c, F\_c+I\_F)$, $[F\_c+I\_F, F\_c+2*I\_F)$, ..., $[F\_c+(N-1)*I\_F, F\_2]$, where the interval of each range is $I\_F=(F\_2-F\_c)/(N-1)$ if assuming the searching order is from low to high in the frequency domain ($I\_F=(F\_c-F\_1)/(N-1)$ and the ranges are $[F\_1, F\_1+I\_F)$, $[F\_1+I\_F, F\_1+2*I\_F)$, ..., $[F\_1+(N-1)*I\_F, F\_c]$ if assuming the searching order is from high to low in the frequency domain), and each of the $2^N$ code-points represents a bitmap indicating which of the N ranges containing SS/PBCH blocks with RMSI. TABLE 10A shows an example of N=8, and TABLE 10B shows an example of N=4.

TABLE 10A

N = 8, F_1 and F_2 can be defined as the lowest and highest carrier frequency of the bandwidth containing sync rasters (i.e., F_1 is the location of first sync raster for that given band, and F_2 is the location of the last sync raster for that given band)

| Code-point Index | Bitmap indicating the ranges of frequency locations containing sync raster(s) |
|---|---|
| 1 | 00000000 |
| 2 | 00000001 |
| ... | ... |
| 255 | 11111110 |
| 256 | 11111111 |

TABLE 10B

N = 4, F_1 and F_2 can be defined as the lowest and highest carrier frequency of the bandwidth containing sync rasters (i.e., F_1 is the location of first sync raster for that given band, and F_2 is the location of the last sync raster for that given band)

| Code-point Index | Bitmap indicating the ranges of frequency locations containing sync raster(s) |
|---|---|
| 1 | 0000 |
| 2 | 0001 |
| ... | ... |
| 15 | 1110 |
| 16 | 1111 |

In one embodiment, when multiple SS/PBCH blocks are supported on a wideband, there can be SS/PBCH blocks not located on a sync raster. For those SS/PBCH blocks, which may or may not be associated a RMSI, and whether or not there is an associated RMSI is indicated by a code-point within the PRB grid offset indication. If a UE successfully detects the SS/PBCH block on a sync raster, and further detects that there is no RMSI associated with the SS/PBCH block, the UE can utilize the 8 bits, which are originally used for RMSI configurations, to indicate the exact location of the next or other SS/PBCH blocks on the sync rasters, such that the UE can skip some of the sync raster locations to blindly search. All the indication method in Component I can be reused here, if the indicated SS/PBCH(s) are on the sync rasters.

In another embodiment, when multiple SS/PBCH blocks are supported on a wideband, there can be SS/PBCH blocks not located on a sync raster. For those SS/PBCH blocks, which may or may not be associated a RMSI, and whether or not there is an associated RMSI is indicated by a code-point within the PRB grid offset indication. If a UE successfully detects the SS/PBCH block not on a sync raster, and further detects that there is no RMSI associated with the SS/PBCH block, the UE can utilize the 8 bits, which are originally used for RMSI configurations, to indicate the exact location of the next or other SS/PBCH blocks, which may or may not be on the sync rasters and may or may not have associated RMSI.

In one example, the 8 bits are utilized to indicate the exact location of another SS/PBCH block, which can be either with or without associated RMSI, wherein each of the 256 code-point represents an exact relative location comparing to the current SS/PBCH block without a RMSI. After decoding these 8 bits from MIB, the UE can directly find the frequency location of another indicated SS/PBCH block. The relative location to the current sync raster with an SS/PBCH block detected is measured by the number of PRBs in term of SS numerology for that band, where the number is always non-negative meaning the relative location is always defined along the initial cell search order within the band. The code-point defining the "0" relative location of the next SS/PBCH block is essential, since the code-point can indicate that within the indication capability (e.g. for a bandwidth of 255 PRBs) using the 8 bits, there is no SS/PBCH sync with RMSI associated, and the UE can skip all the 255 possible PRBs for searching an SS/PBCH block.

In yet another embodiment, when multiple SS/PBCH blocks are supported on a wideband, there can be SS/PBCH blocks not located on a sync raster. For those SS/PBCH blocks, which may or may not be associated a RMSI, and whether or not there is an associated RMSI is indicated by a code-point within the PRB grid offset indication (i.e., a reserved codepoint in ssb-SubcarrierOffset, e.g. r_0). The 8 bits of pdcch-ConfigSIB1 can be reserved for other purpose (e.g. measurement parameter configuration).

At least part of or all of the following fields are provided to be within the contents of a compact DCI format designed exclusively for common control channels, which can include at least one of the transmission of remaining minimum system information (RMSI), broadcast other system information (OSI), paging, and random access response (RAR) in 4-step RACH or 2-step RACH.

In general, two types of PDSCH resource allocation are defined, where type 0 uses bitmap to indicate the resource allocation with a configurable granularity of frequency resources determined by the size of BWP (e.g. one RBG usually consists of multiple VRBs), and type 1 uses resource indication value (MV) to indicate the starting VRB and length of contiguous VRBs in the frequency domain with the granularity of 1 VRB.

In one embodiment, for the common control channels provided in the present disclosure, only single type of resource allocation scheme is supported in the compact DCI format, and no header bit is essentially required to indicate the type of resource allocation (or still keeping the hear bit with a fixed value of indicating the single supported type of resource allocation).

In one example, since for common control channels, message can be received by all UEs in the cell, it is beneficial to try to maximize the utilization of configured resources with the granularity of X VRBs. Hence, only type 1 resource allocation scheme is supported in the compact DCI format. In general, the bit-width of type-1 resource allocation used for the definition of MV can be related to the size of BWP, however, for the common control channels provided in the present disclosure, the definition of RIV can be optimized since the size of BWP for PDSCH is not as flexible as regular PDSCH data.

In one example, the size of BWP to define the MV is fixed for all common control channels, e.g. 96 (which is largest number of RBs for CORESET BW configured in MIB). Then, the bit-width of the field is common for all common control channels. The RIV can be defined according to RIV=96*(L_VRB−1)+S_VRB, where L_VRB is the length of VRBs and S_VRB is the starting VRB index.

Figure 10:
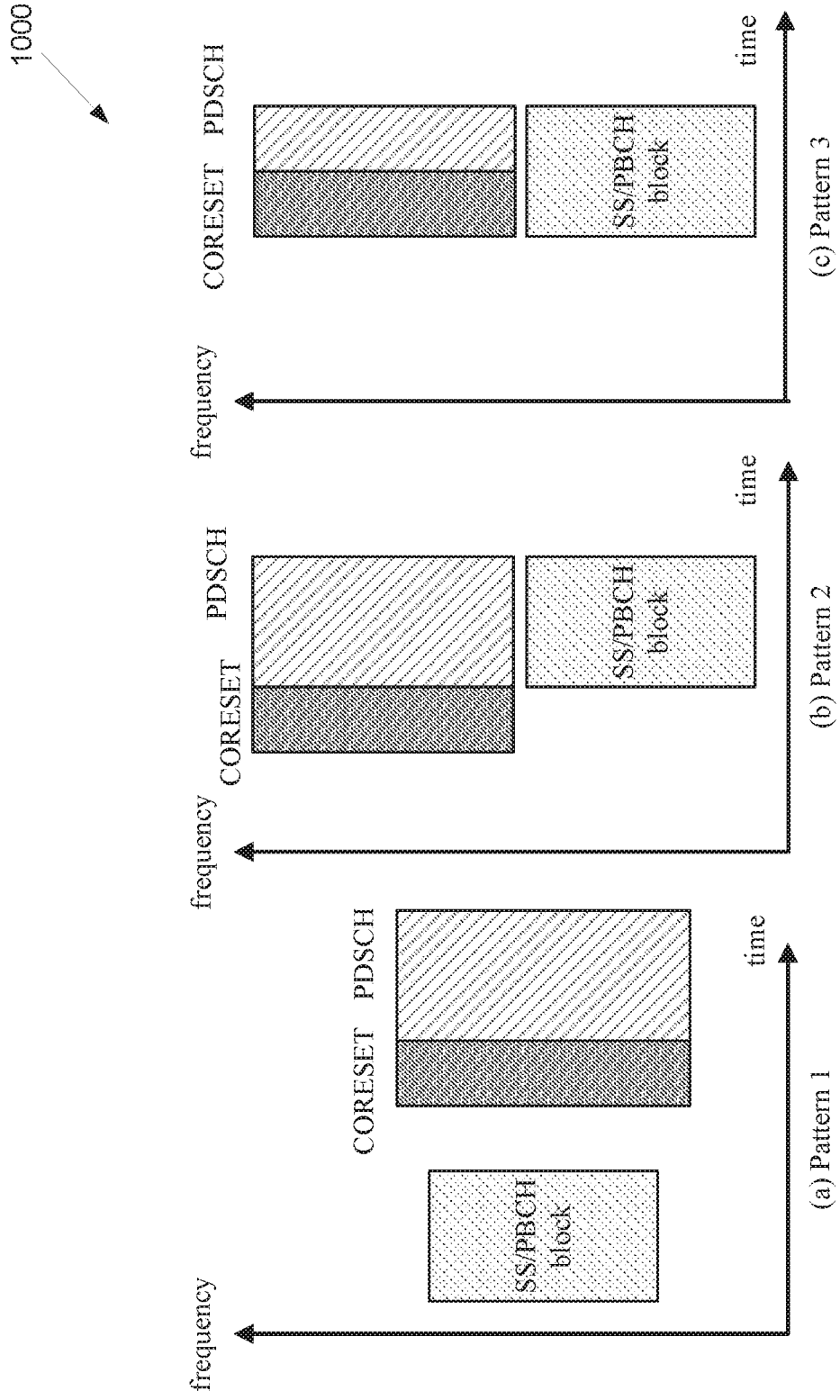
FIG. 10 illustrates an example SS/PBCH block multiplexed with CORESET of RMSI according to embodiments of the present disclosure.

FIG. 10 illustrates an example SS/PBCH block multiplexed with CORESET of RMSI 1000 according to embodiments of the present disclosure. The embodiment of the SS/PBCH block multiplexed with CORESET of RMSI 1000 illustrated in FIG. 10 is for illustration only. FIG. 10 does not limit the scope of the present disclosure to any particular implementation.

Note that one special sub-example of the aforementioned example is, L_VRB=CORESET_BW and S_VRB=0, which means the PDSCH BW is the same as the CORESET_BW, and can be applied to some of the multiplexing patterns (e.g. at least for Pattern 2 and/or Pattern 3 as in FIG. 10, and/or for some cases of Pattern 1 where the PDSCH coverage is limited like with small BW and/or small number of OFDM symbols). In the sub-example, no bit is required and the RIV value (or equivalently L_VRB and S_VRB) can be hard-coded in the spec.

In another example, the size of BWP to define the MV equals to the actual configured CORESET BW in MIB, and can be different for different common control channels. The MV can be defined according to MV=CORESET_BW*(L_VRB−1)+S_VRB, where L_VRB is the length of VRBs, S_VRB is the starting VRB index, and CORESET_BW is the BW of CORESET configured in MIB.

Note that one special sub-example of this example is, L_VRB=CORESET_BW and S_VRB=0, which means the PDSCH BW is the same as the CORESET_BW, and can be applied to some of the multiplexing patterns (e.g. at least for Pattern 2 and/or Pattern 3 as in FIG. 10, and/or for some cases of Pattern 1 where the PDSCH coverage is limited like with small BW and/or small number of OFDM symbols). In this sub-example, no bit is required and the MV value (or equivalently L_VRB and S_VRB) can be hard-coded in the spec.

In one example (can be applied to all the above examples), the starting VRB and length of contiguous VRBs can be configured based on the # of CCEs, e.g. to make the coverage of PDCCH and PDSCH compatible.

In the aforementioned embodiments/examples on the type 1 resource allocation scheme, X is the number of VRBs as the granularity for resource allocation. Note that the value of X determines the number of bits for expressing the field of frequency-domain resources. For instance, the number of bits can be determined according to $\lceil \log 2[(N\_RB\hat{}BWP/X)*(N\_RB\hat{}BWP/X+1)/2] \rceil$, where $N\_RB\hat{}BWP$ is the number of RBs in the provided BWP, and for RMSI, $N\_RB\hat{}BWP$ can be same as CORESET BW in term of RBs.

In one example, X is predefined in the spec, and takes a common value for the cases type 1 resource allocation scheme is utilized. For instance, X=1, which corresponds to the most flexible resource allocation case, but may require more number of bits for expressing this field. For other instances, X=2, or 4, or 6, which corresponds to less flexible resource allocation cases, comparing to X=1, but may require less number of bits. For another instance, X is the same as the granularity of interleaver.

In another example, X is predefined in the spec, and the particular value is defined based on the CORESET BW. In this example, there can be multiple values for X depending on CORESET BW. The purpose of this multiple granularity for X is trying to align the number of bits for expressing the field of frequency-domain resources when the total BW is different, e.g. CORESET BW in RB/X is a constant at least for some of the values of CORESET BW. Some particular instances for this example are shown in TABLES 11 to 13.

TABLE 11

CORESET BW in RB/X

| CORESET BW in RB | X in RB | Number of bits for expressing the field of frequency-domain resources |
|---|---|---|
| 24 | 1 | 9 |
| 48 | 2 | 9 |
| 96 | 4 | 9 |

TABLE 12

CORESET BW in RB/X

| CORESET BW in RB | X in RB | Number of bits for expressing the field of frequency-domain resources |
|---|---|---|
| 24 | 2 | 7 |
| 48 | 4 | 7 |
| 96 | 8 | 7 |

TABLE 13

CORESET BW in RB/X

| CORESET BW in RB | X in RB | Number of bits for expressing the field of frequency-domain resources |
|---|---|---|
| 24 | 2 | 7 |
| 48 | 4 | 7 |
| 96 | 6 | 8 |

In yet another example, X is configurable by RRC, and a default value is assumed by the UE in initial access. For instance, the default X=1, which corresponds to the most flexible resource allocation case, but may require more number of bits for expressing this field, e.g. for CORESET BW as 96 RBs the number of bits required is 13. For other instances, the default X=2, or 4, or 6, which corresponds to less flexible resource allocation cases, comparing to X=1, but may require less number of bits. For another instance, the default X is the same as the granularity of interleaver.

In another embodiment, for the common control channels provided in the present disclosure, both types of resource allocation scheme are supported in the compact DCI format to give full flexibility for PDSCH resource allocation in the frequency domain, and the definition of bitmap in type 0 and definition of RIV in type 1 can refer to the definition for general cases, or using the one described in the above embodiment where only type 1 resource allocation is supported.

In general, block interleaved VRB-to-PRB mapping is supported for type 1 resource allocation to obtain the frequency diversity gain, and the indication of block interleaved or non-block interleaved VRB-to-PRB mapping can be carried one bit in the DCI format.

In one embodiment, for the common control channels provided in the present disclosure, if only type 1 resource allocation scheme is supported, only block interleaved VRB-to-PRB mapping is supported to obtain the frequency diversity gain, and no indication is required in the compact DCI format. In this case, since only initial active BWP is utilized for transmitting the common control channels, the block interleaved VRB-to-PRB mapping can be performed within the whole initial active BWP, which is much simpler than a general case where multiple BWPs can exist and overlap. In this embodiment, the field of VRB-to-PRB mapping can be hard-coded in the spec as block interleaved VRB-to-PRB mapping, and the block size for interleaving can also be hard-coded in the spec (e.g. the same as the granularity for resource allocation).

In another embodiment, for the common control channels provided in the present disclosure, both block interleaved and non-block interleaved VRB-to-PRB mapping are supported, and one bit in the compact DCI format is used to indicate the VRB-to-PRB mapping pattern (e.g. either block interleaved or non-block interleaved).

In general, the time-domain PDSCH resources are characterized by the slot-level timing difference between the slot containing the corresponding CORESET and the slot containing the PDSCH (e.g. denoted as T_slot), together with the starting OFDM symbol within the slot (e.g. denoted as S_sym) and length of OFDM symbols for PDSCH (e.g. denoted as L_sym).

In one embodiment, for the common control channels provided in the present disclosure, the time-domain PDSCH resources can be defined per multiplexing pattern of SS/PBCH block and CORESET/PDSCH. Note that as shown in FIG. 10, three multiplexing patterns of SS/PBCH block and CORESET/PDSCH are supported in NR.

In one example, Pattern 1 refers to the multiplexing pattern that SS/PBCH block and RMSI CORESET occur in different time instances, and SS/PBCH block TX BW and the initial active DL BWP containing RMSI CORESET overlap. Note that the time difference between the SS/PBCH block and CORESET/PDSCH can be either 0 or larger than one slot.

In another example, Pattern 2 refers to the multiplexing pattern that SS/PBCH block and RMSI CORESET occur in different time instances, and SS/PBCH block TX BW and the initial active DL BWP containing RMSI CORESET do not overlap.

In yet another example, Pattern 3 refers to the multiplexing pattern that SS/PBCH block and RMSI CORESET occur in the same time instance, and SS/PBCH block TX BW and the initial active DL BWP containing RMSI CORESET do not overlap.

In one example, if the multiplexing pattern of SS/PBCH block and CORESET/PDSCH is configured as Pattern 1, which is indicated in the MIB of NR-PBCH within the SS/PBCH block, T_slot can be a configurable integer with several values, and S_sym and L_sym can be jointly coded into a RIV. For instance, the slot level difference T_slot can be configured from 0, 2*u, 5*u, 7*u for <6 GHz and from 0, 2.5*u, 5*u, 7.5*u for >6 GHz, where u=SS_SCS/15 kHz. For another instance, S_sym and L_sym can be jointly by a RIV coded according to if L_sym−1<7, then RIV=14*(L_sym−1)+S_sym; else, RIV=14*(14−L_sym+1)+(14−1−S_sym).

In one instance, the time-domain PDSCH resources (e.g. L_sym, S_sym, and T_slot) for Pattern 1 can be determined based on the value M in the table of Parameters for PDCCH monitoring occasions, where M refers to the time difference (measured in slot) between slots containing CORESET corresponding to the SS/PBCH block with index i and i+1.

In one example, T_slot>0 if M=2, which means the cross-slot scheduling of PDSCH can be supported if the slot difference between CORESETs is 2 slots.

In one example, T_slot=0 if M=1/2 and M=1, which means the same-slot scheduling of PDSCH can be supported if the slot difference between CORESETs is ½ and 1 slot.

In such example, the time-domain PDSCH resources (e.g. L_sym, S_sym, and T_slot) for Pattern 1 can be determined based on the configuration of RMSI in MIB, i.e., RMSI-PDCCH-Config. If a 4 bits table containing at most 16 configurations is defined for the PDSCH time-domain resources for the general case, at least one configuration in the table can be used for each configuration of RMSI (i.e., each value of RMSI-PDCCH-Config).

In one particular example, only one configuration in the table is used for each configuration of RMSI, then the association can be hard coded in the spec and no bit is required for this field. In another particular example, at most Y configurations in the table are used for each configuration of RMSI, then at most log 2(Y) bits are required for this field, e.g. Y=4 for a comprehensive example on the complexity and flexibility.

In another example, the aforementioned embodiments/example can be combined or independent with this example and the scrambling sequence of PDCCH within the CORESET can be based on SS/PBCH block index, such that UE can detect the SS/PBCH block index within the monitoring window duration and save the transmission of some of the SS/PBCH blocks.

In another example, if the multiplexing pattern of SS/PBCH block and CORESET/PDSCH is configured as Pattern 2, which is indicated in the MIB of NR-PBCH within the SS/PBCH block, T_slot can be hard-coded as 0 (or no this field in the DCI format for Pattern 2), and S_sym and L_sym can determined by symbols within the slot mapped for SS/PBCH blocks (e.g. determined from the SS block index I_SSB and the subcarrier spacing of SS/PBCH block SCS_SS). Note that in one embodiment, S_sym and L_sym can still be jointly coded by a RIV using the same method as in Pattern 1, or S_sym and L_sym can be hard-coded in the spec and no field for time-domain PDSCH resources in the DCI format is needed.

In one instance, S_sym can be the symbol that is mapped for the first symbol of the corresponding SS/PBCH block (i.e., the symbol mapped for NR-PSS), and L_sym can be hard-coded as 4. TABLE 14 shows a list of examples for this instance.

TABLE 14

| SCS_SS | T_slot | S_sym | L_sym | RIV (if jointly coded) |
|---|---|---|---|---|
| 15 kHz | 0 | 2 if mod(I_SSB, 2) = 0;<br>8 if mod(I_SSB, 2) = 1 | 4 | 44 if mod(I_SSB, 2) = 0;<br>50 if mod(I_SSB, 2) = 1 |
| 30 kHz Mapping 1 | 0 | 4 if mod(I_SSB, 4) = 0;<br>8 if mod(I_SSB, 4) = 1;<br>2 if mod(I_SSB, 4) = 2;<br>6 if mod(I_SSB, 4) = 3 | 4 | 46 if mod(I_SSB, 4) = 0;<br>50 if mod(I_SSB, 4) = 1;<br>44 if mod(I_SSB, 4) = 2;<br>48 if mod(I_SSB, 4) = 3 |
| 30 kHz Mapping 2 | 0 | 2 if mod(I_SSB, 2) = 0;<br>8 if mod(I_SSB, 2) = 1 | 4 | 44 if mod(I_SSB, 2) = 0;<br>50 if mod(I_SSB, 2) = 1 |
| 120 kHz | 0 | 4 if mod(I_SSB, 4) = 0;<br>8 if mod(I_SSB, 4) = 1;<br>2 if mod(I_SSB, 4) = 2;<br>6 if mod(I_SSB, 4) = 3 | 4 | 46 if mod(I_SSB, 4) = 0;<br>50 if mod(I_SSB, 4) = 1;<br>44 if mod(I_SSB, 4) = 2;<br>48 if mod(I_SSB, 4) = 3 |
| 240 kHz | 0 | 8 if mod(I_SSB, 8) = 0;<br>12 if mod(I_SSB, 8) = 1;<br>2 if mod(I_SSB, 8) = 2;<br>6 if mod(I_SSB, 8) = 3;<br>4 if mod(I_SSB, 8) = 4;<br>8 if mod(I_SSB, 8) = 5;<br>12 if mod(I_SSB, 8) = 6;<br>2 if mod(I_SSB, 8) = 7 | 4 | 50 if mod(I_SSB, 8) = 0;<br>54 if mod(I_SSB, 8) = 1;<br>44 if mod(I_SSB, 8) = 2;<br>48 if mod(I_SSB, 8) = 3;<br>46 if mod(I_SSB, 8) = 4;<br>50 if mod(I_SSB, 8) = 5;<br>54 if mod(I_SSB, 8) = 6;<br>44 f mod(I_SSB, 8) = 7 |

In another instance, S_sym can be the symbol that is mapped for the first symbol of the corresponding SS/PBCH block (i.e., the symbol mapped for NR-PSS, and can refer to TABLE 14 for the particular values of T_slot for each SCS_SS), and L_sym can be configured (e.g. configurable among 1, 2, 3, and 4).

In yet another example, if the multiplexing pattern of SS/PBCH block and CORESET/PDSCH is configured as Pattern 3, which is indicated in the MIB of NR-PBCH within the SS/PBCH block, T_slot can be hard-coded as 0 (or no this field in the DCI format for Pattern 3), and S_sym and L_sym can determined by symbols within the slot mapped for SS/PBCH blocks (e.g. determined from the SS block index I_SSB and the subcarrier spacing of SS/PBCH block SCS_SS). Note that in one embodiment, S_sym and L_sym can still be jointly coded by a RIV using the same method as in Pattern 1, or S_sym and L_sym can be hard-coded in the spec and no field for time-domain PDSCH resources in the DCI format is needed.

In one instance, S_sym can be the symbol that is mapped for the third symbol of the corresponding SS/PBCH block (i.e., the symbol mapped for NR-SSS and NR-PBCH), and L_sym can be hard-coded as 2. TABLE 15 shows a list of examples for this instance.

TABLE 15

S_sym and L_sym

| SCS_SS | T_slot | S_sym | L_sym | RIV (if jointly coded) |
|---|---|---|---|---|
| 15 kHz | 0 | 4 if mod(I_SSB, 2) = 0;<br>10 if mod(I_SSB, 2) = 1 | 2 | 46 if mod(I_SSB, 2) = 0;<br>52 if mod(I_SSB, 2) = 1 |
| 30 kHz Mapping 1 | 0 | 6 if mod(I_SSB, 4) = 0;<br>10 if mod(I_SSB, 4) = 1;<br>4 if mod(I_SSB, 4) = 2;<br>8 if mod(I_SSB, 4) = 3 | 2 | 48 if mod(I_SSB, 4) = 0;<br>52 if mod(I_SSB, 4) = 1;<br>46 if mod(I_SSB, 4) = 2;<br>50 if mod(I_SSB, 4) = 3 |
| 30 kHz Mapping 2 | 0 | 4 if mod(I_SSB, 2) = 0;<br>10 if mod(I_SSB, 2) = 1 | 2 | 46 if mod(I_SSB, 2) = 0;<br>52 if mod(I_SSB, 2) = 1 |
| 120 kHz | 0 | 6 if mod(I_SSB, 4) = 0;<br>10 if mod(I_SSB, 4) = 1;<br>4 if mod(I_SSB, 4) = 2;<br>8 if mod(I_SSB, 4) = 3 | 2 | 48 if mod(I_SSB, 4) = 0;<br>52 if mod(I_SSB, 4) = 1;<br>46 if mod(I_SSB, 4) = 2;<br>50 if mod(I_SSB, 4) = 3 |
| 240 kHz | 0 | 10 if mod(I_SSB, 8) = 0;<br>0 if mod(I_SSB, 8) = 1;<br>4 if mod(I_SSB, 8) = 2;<br>8 if mod(I_SSB, 8) = 3;<br>6 if mod(I_SSB, 8) = 4;<br>10 if mod(I_SSB, 8) = 5;<br>0 if mod(I_SSB, 8) = 6;<br>4 if mod(I_SSB, 8) = 7 | 2 | 52 if mod(I_SSB, 8) = 0;<br>56 if mod(I_SSB, 8) = 1;<br>46 if mod(I_SSB, 8) = 2;<br>50 if mod(I_SSB, 8) = 3;<br>48 if mod(I_SSB, 8) = 4;<br>52 if mod(I_SSB, 8) = 5;<br>56 if mod(I_SSB, 8) = 6;<br>45 f mod(I_SSB, 8) = 7 |

In another embodiment, for the common control channels provided in the present disclosure, the time-domain PDSCH resources can be jointly coded with frequency-domain PDSCH resources, and defined per multiplexing pattern of SS/PBCH block and CORESET/PDSCH (using same or different bit-width for each multiplexing pattern). Note that as shown in FIG. 10, three multiplexing patterns of SS/PBCH block and CORESET/PDSCH are supported in NR.

In one example, if the multiplexing pattern of SS/PBCH block and CORESET/PDSCH is configured as Pattern 1, the time-domain and frequency-domain resources can be jointly coded, where the total number of REs are configurable. In one example, the total number of REs is compatible with the number of CCEs in CORESET from the perspective of similar coverage.

In another example, if the multiplexing pattern of SS/PBCH block and CORESET/PDSCH is configured as Pattern 2, the time-domain and frequency-domain resources can be jointly coded, where both the time-domain and frequency-domain resources are hard-coded.

In another example, if the multiplexing pattern of SS/PBCH block and CORESET/PDSCH is configured as Pattern 3, the time-domain and frequency-domain resources can be jointly coded, where both the time-domain and frequency-domain resources are hard-coded.

In general, the modulation and coding scheme of the PDSCH are captured by the MCS table. In one embodiment, for the common control channels provided in the present disclosure, the modulation and coding scheme of the PDSCH can be captured by a compact version of the MCS table, where only low-order of modulation schemes are supported in the compact DCI format, such that the bit-width of this field in the compact DCI format can be smaller than the one in other DCI formats.

In one embodiment, within all the common control channels provided in the present disclosure, some channels like broadcast OSI and RMSI encode messages into multiple blocks and mapped for different transmissions, such that redundancy version is required to mark the different encoded blocks. Hence, only for those channels, the compact DCI format may have the field of redundancy version with different values (e.g. 4 values denoted by 2 bits or 8 values denoted by 3 bits), and for the other channels, the compact DCI format may leave the corresponding field as a default value (e.g. 0).

In another embodiment, within all the common control channels provided in the present disclosure, some channels like broadcast OSI and RMSI encode messages into multiple blocks and mapped for different transmissions, such that redundancy version is required to mark the different encoded blocks. The redundancy version can be determined based on the SFN value (i.e., the timing within the TTI), and known to the UE such that no bit for the field of redundancy version is required for the common control channels provided in the present disclosure.

In general, TPC (Transmission Power Control) command can be transmission as part of DCI format with common search space. In one embodiment, for the common control channels provided in the present disclosure, the compact DCI format can have a field for TPC Command for PUCCH (e.g. with 2 bits). In another embodiment, for the common control channels provided in the present disclosure, the field for compact DCI format is not required before the RRC connection.

The header field for the compact DCI format is only needed when the compact DCI format for the common control channels has the same DCI size as another DCI format (e.g. some fallback DCI format or another compact DCI format for msg4 of RACH), and in that case, the header field is utilized to distinguish different DCI format. If there is no DCI format with the same DCI size as the compact DCI format for the common control channels, no header field is essentially required.

In general, this flag is utilized to indicate whether reserved resources, in both frequency domain and time domain, are excluded from the rectangle resources allocated for PDSCH, wherein the reserved resources can be utilized for other purpose, e.g. for forward compatibility or LTE-NR coexistence. In one embodiment, for the same purpose, this flag(s) are still present for the compact DCI format designed for the common control channels. In another embodiment, this field does not present before the RRC connection, and is not needed for the common control channels provided in the present disclosure.

At least part of or all of the following fields are not provided to be within the contents of a compact DCI format designed exclusively for common control channels, which can include at least one of the transmission of RMSI, OSI, paging, and RAR.

The common control channels provided in the present disclosure are mainly for initial access purpose, hence, the carrier and BWP for transmitting the common control channels provided in the present disclosure do not need to be configured or indicated. In one embodiment, the compact DCI format for the common control channels provided in the present disclosure does not contain the fields of carrier indicator or BWP indicator.

In one embodiment, the bundling size for PDSCH for the common control channels provided in the present disclosure is fixed (e.g. 6 PRBs), and the compact DCI format for the common control channels provided in the present disclosure does not contain the field of bundling size indicator.

The common control channels provided in the present disclosure may not have new data transmission, hence, the new data indicator is not applicable. In one embodiment, the compact DCI format for the common control channels provided in the present disclosure does not contain the field of new data indicator.

The common control channels provided in the present disclosure may only have single codeword, and the parameters related to the second codeword may not be applicable to the common control channels. In one embodiment, the compact DCI format for the common control channels provided in the present disclosure does not contain the fields of parameters for the second codeword, including modulation and coding scheme, new data indicator, and redundancy version.

The common control channels provided in the present disclosure may not have any HARQ process, and parameters related to the HARQ may not be applicable to the common control channels. In one embodiment, the compact DCI format for the common control channels provided in the present disclosure does not contain the fields of parameters for HARQ process, including HARQ process number, CBGFI, CBGTI, ACK/NACK resource index, HARQ timing indicator, and downlink assignment index.

Note that in one embodiment, if the compact DCI format is also applicable to msg4 of RACH, HARQ process related parameters may be provided as fields in the compact DCI format.

The common control channels provided in the present disclosure may not have multiple configurations for antenna ports and may only support single layer transmission, such that the configuration for antenna port(s) can be fixed for PDSCH of the common control channels. In one embodiment, the compact DCI format for the common control channels provided in the present disclosure does not contain the field for antenna port(s).

In general, Transmission Configuration Indication (TCI) is utilized to provide beam indication to indicate QCL assumption between DL RS antenna port(s) and DMRS antenna port(s) of DL data channel at least w.r.t. spatial QCL parameter. For the common control channels provided in the present disclosure, the common control channels are all QCLed with corresponding SS/PBCH block such that no TCI is required for the common control channels. In one embodiment, the compact DCI format for the common control channels provided in the present disclosure does not contain the field for TCI.

One example of the compact DCI format design for the common control channels is shown in TABLE 16, where the total DCI size is around 20 to 30 bits, which is much smaller than other DCI formats (e.g. at least around 40 to 50 bits).

TABLE 16

Compact DCI format design

| Field | #Bits |
| --- | --- |
| Frequency-domain PDSCH Resources | 13 |
| Time-domain PDSCH Resources | ≤4 |
| VRB-to-PRB Mapping Type | 1 |
| Reserved Resource Set On/Off | 2 |
| Modulation and Coding Scheme | <5 |
| Redundancy Version | 2 |
| TPC Command for PUCCH | 2 |

In another example of the compact DCI format design for the common control channels is shown in TABLE 17, where the total DCI size is based on the SS/PBCH block and CORESET multiplexing pattern, which is around 15 bits for Pattern 1 and smaller than 5 bits for Pattern 2 and Pattern 3.

TABLE 17

Compact DCI format design

| Field | #Bits for multiplexing Pattern 1 | #Bits for multiplexing Pattern 2 and 3 |
| --- | --- | --- |
| Frequency-domain PDSCH Resources | 13 | ≤13 |
| Time-domain PDSCH Resources | ≤2 | 0 |
| Modulation and Coding Scheme | <5 | <5 |

The DMRS sequence of PDCCH is constructed by QPSK modulated Gold-sequence which if the XOR of two length-L M-sequences, where one of the M-sequence $s_A(n)$ is generated with generator $g_A(x)$ and initial condition $c_A$, and the other M-sequence $s_B(n)$ is generated with generator $g_B(x)$ and initial condition $c_B$. There is an possible output shift offset Nc (e.g. Nc=1600 as in LTE) such that the QPSK modulated Gold-sequence $s(n)=(1-2*((s_A(2n+Nc)+s_B(2n+Nc)) \mod 2))/\sqrt{2}+j*(1-2*((s_A(2n+Nc+1)+s_B(2n+Nc+1)) \mod 2))/\sqrt{2}$ and $s(n)$ is truncated to the desired DMRS sequence length N_DMRS. The length of Gold-sequence L is the same as LTE-CRS (e.g. $2^{31}-1$), and one of the M-sequence $s_A(n)$ is given by $g_A(x)=x^{31}+x^3+1$ with initial condition $c_A$ fixed (e.g. $c_A=1$), and the other M-sequence $s_B(n)$ is given by $g_B(x)=x^{31}+x^3+x^2+x+1$ with initial condition $c_B$. The initial condition $c_B$ carries the ID (either cell ID or C-RNTI) and timing related index such that the DMRS sequence varies over time.

In one embodiment, the timing related index contains slot index and symbol index, and the initial condition is a product form of the ID and timing related index.

In one example, $c_B=\mod(c\_1*(N\_ID+1)*(14*N\_slot+N\_symbol+1)+c\_2*(14*N\_slot+N\_symbol+1)+c\_3*(N\_ID+1),2^{31})$ where c_1, c_2 and c_3 are predefined integers. Note that in this example, $c\_1 > 2^{12}$ such that mod $2^{31}$ is needed.

In another example, $c_B=\mod(c\_1*(2*N\_ID+1)*(14*N\_slot+N\_symbol+1)+c\_2*(14*N\_slot+N\_symbol+1)+c\_3*(2*N\_I D+1), 2^{31})$ where c_1, c_2 and c_3 are predefined integers. Note that in this example, $c\_1 > 2^{11}$ such that mod $2^{31}$ is needed.

In another example, $c_B=c\_1*(N\_ID+1)*(14*N\_slot+N\_symbol+1)+c\_2*(14*N\_slot+N\_symbol+1)+c\_3*(N\_ID+1)$ where c_1, c_2 and c_3 are predefined integers. Note that in this example, $c\_1<2^{\wedge}12$. In one instance, $c\_1=2$, $c\_2=2^{\wedge}12$, and $c\_3=0$, i.e, $c_B=2*(N\_ID+1)*(14*N\_slot+N\_symbol+1)+2^{\wedge}12*(14*N\_slot+N\_symbol+1)$).

In another example, $c_B=c\_1*(2*N\_ID+1)*(14*N\_slot+N\_symbol+1)+c\_2*(14*N\_slot+N\_symbol+1)+c\_3*(2*N\_ID+1)$ where $c\_1$, $c\_2$ and $c\_3$ are predefined integers. Note that in this example, $c\_1<2^{\wedge}11$.

Figure 11:
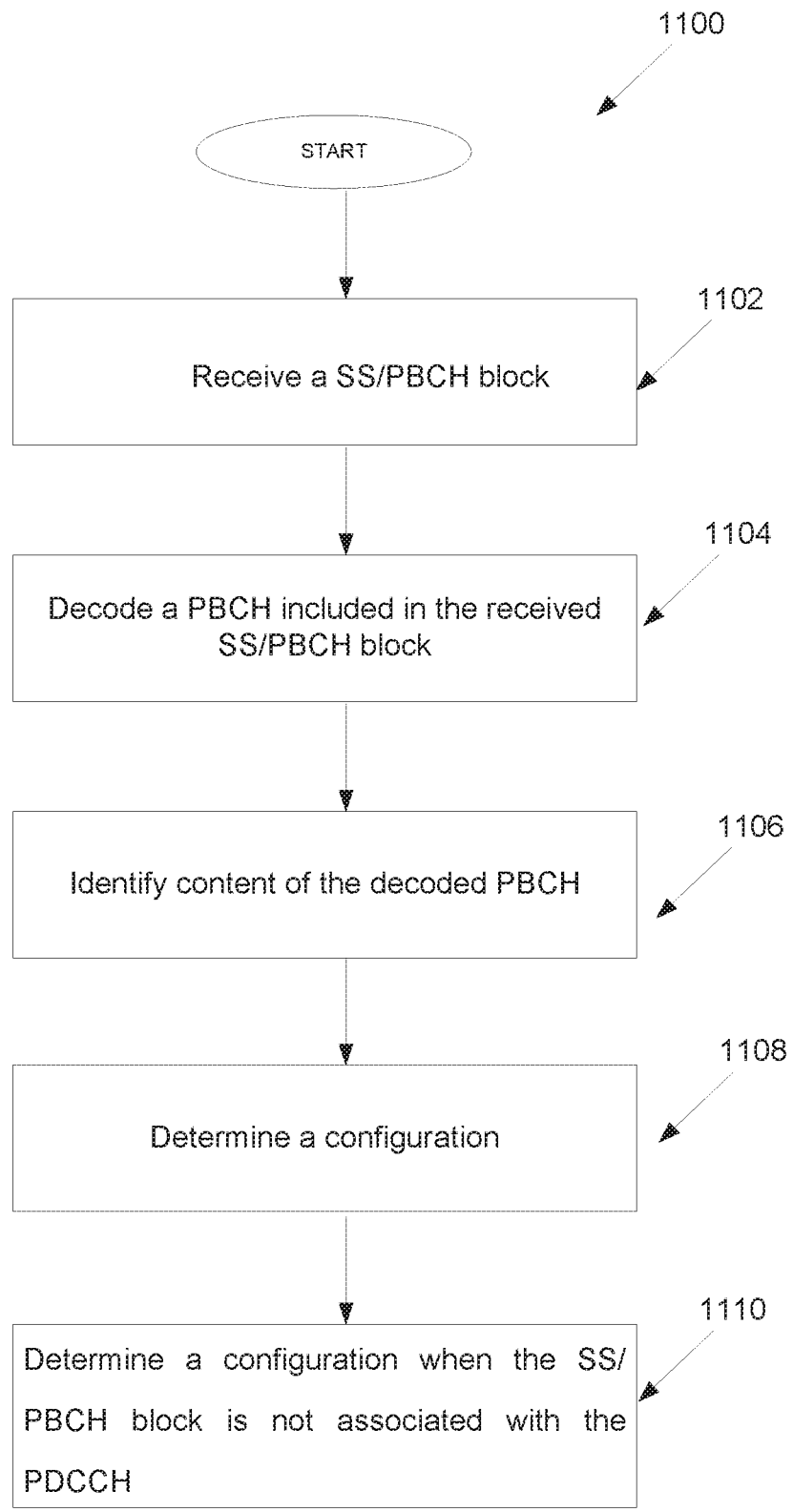
FIG. 11 illustrates a flow chart of a method for a UE according to embodiments of the present disclosure.

FIG. 11 illustrates a flow chart of a method 1100 for a UE according to embodiments of the present disclosure. The embodiment of the method 1100 illustrated in FIG. 11 is for illustration only. FIG. 11 does not limit the scope of the present disclosure to any particular implementation.

As illustrated in FIG. 11, the method 1100 begins at start. In step 1102, the UE (e.g., 111-116 as illustrated in FIG. 1) receives, from a base station (BS), a synchronization signal and physical broadcast channel (SS/PBCH) block including the PBCH using a first frequency location (GSCN-Current) over downlink channels, GSCN-Current being based on a set of predefined synchronization rasters that is determined by a global synchronization channel number (GSCN).

In one embodiment, in step 1102, the SS/PBCH block that is associated with the PDCCH including the scheduling information for the RMSI on the determined GSCN-Current is indicated by at least one of for a first carrier frequency range, a field of ssb-SubcarrierOffset in the content of the PBCH based on a value from {0, 1, 2, 3, 4, 5, 6, 7, 8, 9, 10, 11, 12, 13, 14, 15} and a field of $\bar{a}_{\bar{A}+5}$ in the content of the PBCH with a value of 0, for the first carrier frequency range, the field of ssb-SubcarrierOffset in the content of the PBCH based on a value from {0, 1, 2, 3, 4, 5, 6, 7} and the field of $\bar{a}_{\bar{A}+5}$ in the content of the PBCH with a value of 1, or for a second carrier frequency range, the field of ssb-SubcarrierOffset in the content of the PBCH based on a value from {0, 1, 2, 3, 4, 5, 6, 7, 8, 9, 10, 11}.

In one embodiment, in step 1102, the SS/PBCH block that is not associated with the PDCCH including the scheduling information for the RMSI on the determined GSCN-Current is indicated by at least one of for a first frequency range, a field of ssb-SubcarrierOffset in the content of the PBCH based on a value from {8, 9, 10, 11, 12, 13, 14, 15} and a field of $\bar{a}_{\bar{A}+5}$ in the content of the PBCH with a value of 1 or for a second frequency range, the field of ssb-SubcarrierOffset in the content of the PBCH based on a value from {12, 13, 14, 15}.

In such embodiment, a frequency range in which no other SS/PBCH blocks configured with the PDCCH including the scheduling information for the RMSI are transmitted is indicated by at least one of for a first carrier frequency range, GSCN-Current−[pdcch-ConfigSIB1/16] to GSCN-Current+pdcch-ConfigSIB1 mod 16 when a field of ssb-SubcarrierOffset in the content of the PBCH with a value of 15 and a field of $\bar{a}_{\bar{A}+5}$ in the content of the PBCH with a value of 1 or for a second carrier frequency range, GSCN-Current−[pdcch-ConfigSIB1/16] to GSCN-Current+pdcch-ConfigSIB1 mod 16 when the field of ssb-SubcarrierOffset in the content of the PBCH with a value of 15. In such embodiment, the pdcch-ConfigSIB1 comprises a 8-bit long in the content of the PBCH.

In such embodiment, the frequency range in which no other SS/PBCH blocks configured with the PDCCH including the scheduling information for the RMSI are transmitted is given by GSCN-Current when pdcch-ConfigSIB1=0.

In such embodiment, the second frequency location on which other SS/PBCH blocks configured with the PDCCH including the scheduling information for the RMSI are transmitted is indicated by at least one of for a first carrier frequency range 1, GSCN-Current+256*(ssb-SubcarrierOffset−8)+pdcch-ConfigSIB1+1 when a field of ssb-SubcarrierOffset in the content of the PBCH based on a value from {8, 9, 10} and a field of $\bar{a}_{\bar{A}+5}$ in the content of the PBCH with a value of 1, for the first carrier frequency range 1, GSCN-Current−256*(ssb-SubcarrierOffset−11)−pdcch-ConfigSIB1−1 when the field of ssb-SubcarrierOffset in the content of the PBCH based on a value from {11, 12, 13} and the field of $\bar{a}_{\bar{A}+5}$ in the content of the PBCH with a value of 1, for a second carrier frequency range, GSCN-Current+pdcch-ConfigSIB1+1 when the field of ssb-SubcarrierOffset in the content of the PBCH with a value of 12, or for the second carrier frequency range, GSCN-Current−pdcch-ConfigSIB1−1 when the field of ssb-SubcarrierOffset in the content of the PBCH with a value of 13

In such embodiment, the pdcch-ConfigSIB1 is a 8-bit long in the content of the PBCH.

In one embodiment, when the SS/PBCH block is configured with a PDCCH including the scheduling information for the RMSI on the determined GSCN-Current, the processor is further configured to determine the scheduling information for the RMSI based on a multiplexing pattern of the SS/PBCH block and a control resource set (CORESET) including the PDCCH, the scheduling information for the RMSI including at least a time-domain resource allocation of a physical downlink shared channel (PDSCH) for RMSI.

In step 1104, the UE decoded a PBCH included in the received SS/PBCH block.

In step 1106, the UE identifies content of the decoded PBCH.

In step 1108, the UE determines a configuration for at least one of the SS/PBCH block that is associated with a physical downlink control channel (PDCCH) including scheduling information for remaining minimum system information (RMSI) on the GSCN-Current or the SS/PBCH block that is not associated with the PDCCH including the scheduling information for the RMSI on the GSCN-Current.

In step 1110, the UE determine, when the SS/PBCH block is not associated with the PDCCH including the scheduling information for the RMSI on the GSCN-Current, the configuration to include at least one of a frequency range in which no other SS/PBCH blocks configured with the PDCCH including the scheduling information for the RMSI are transmitted, the frequency range determined based on the GSCN or a second frequency location on which other SS/PBCH blocks configured with the PDCCH including the scheduling information for the RMSI are transmitted, the GSCN-Current determined based on the GSCN.

Figure 12:
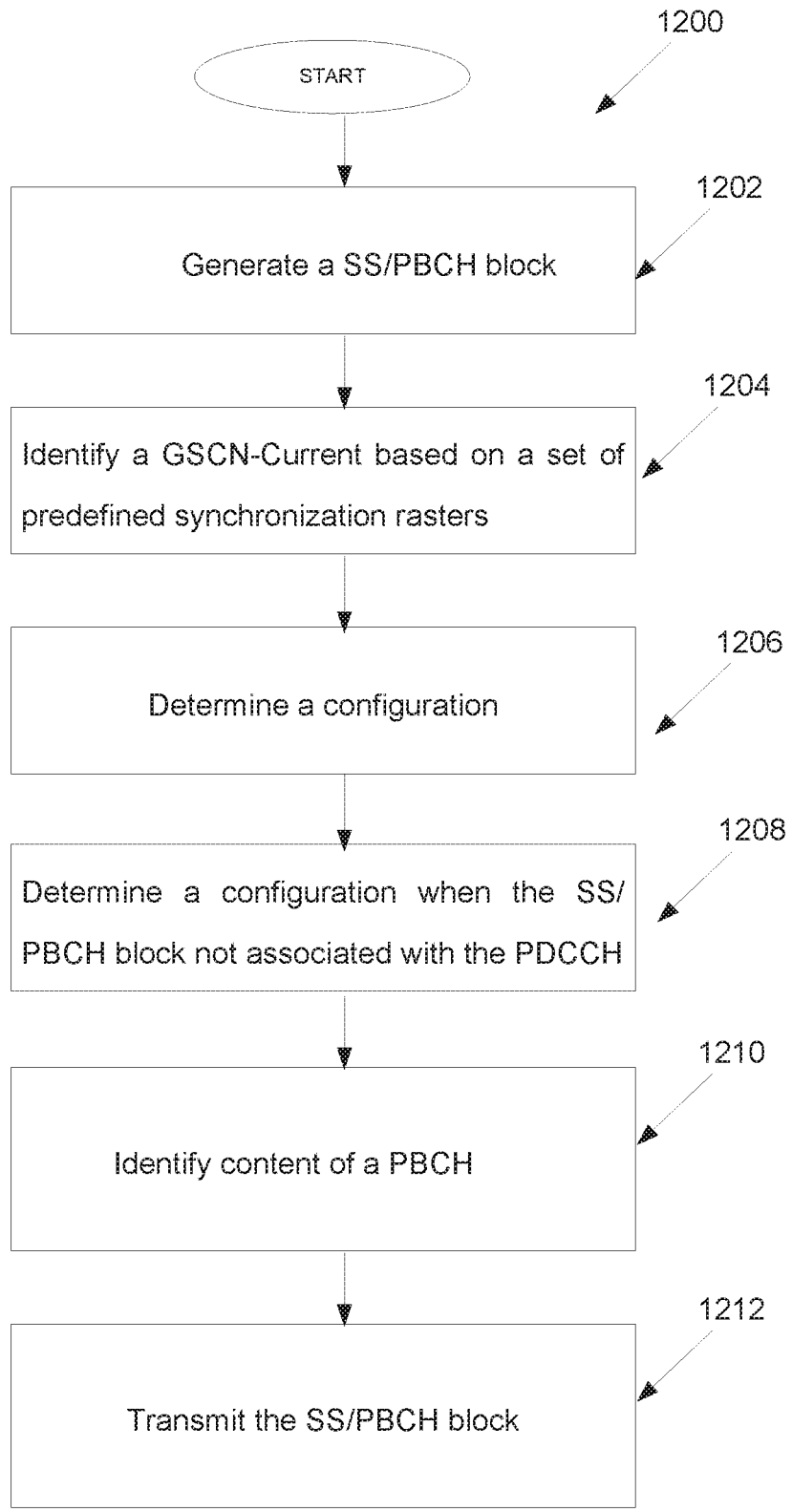
FIG. 12 illustrates a flow chart of a method for a BS according to embodiments of the present disclosure.

FIG. 12 illustrates a flow chart of a method 1200 for a BS according to embodiments of the present disclosure. The embodiment of the method 1200 illustrated in FIG. 12 is for illustration only. FIG. 12 does not limit the scope of the present disclosure to any particular implementation.

As illustrated in FIG. 12, the method 1200 begins at step 1202. The BS (e.g., 101-103 as illustrated in FIG. 1). In step 1202, the BS generates a synchronization signal and physical broadcast channel (SS/PBCH) block.

In one embodiment, in step 1202, the SS/PBCH block that is associated with the PDCCH including the scheduling information for the RMSI on the determined GSCN-Current is indicated by at least one of for a first carrier frequency range, a field of ssb-SubcarrierOffset in the content of the PBCH based on a value from {0, 1, 2, 3, 4, 5, 6, 7, 8, 9, 10, 11, 12, 13, 14, 15} and a field of $\bar{a}_{\bar{A}+5}$ in the content of the PBCH with a value of 0, for the first carrier frequency range, the field of ssb-SubcarrierOffset in the content of the PBCH based on a value from {0, 1, 2, 3, 4, 5, 6, 7} and the field of $\bar{a}_{\bar{A}+5}$ in the content of the PBCH with a value of 1, or for a second carrier frequency range, the field of ssb-Subcarrier-Offset in the content of the PBCH based on a value from {0, 1, 2, 3, 4, 5, 6, 7, 8, 9, 10, 11}.

In one embodiment, in step 1202, the SS/PBCH block that is not associated with the PDCCH including the scheduling information for the RMSI on the determined GSCN-Current is indicated by at least one of for a first frequency range, a field of ssb-SubcarrierOffset in the content of the PBCH based on a value from {8, 9, 10, 11, 12, 13, 14, 15} and a field of $\bar{a}_{\bar{A}+5}$ in the content of the PBCH with a value of 1 or for a second frequency range, the field of ssb-Subcarrier-Offset in the content of the PBCH based on a value from {12, 13, 14, 15}.

In such embodiment, a frequency range in which no other SS/PBCH blocks configured with the PDCCH including the scheduling information for the RMSI are transmitted is indicated by at least one of for a first carrier frequency range, GSCN-Current−[pdcch-ConfigSIB1/16] to GSCN-Current+pdcch-ConfigSIB1 mod 16 when a field of ssb-Subcarrier-Offset in the content of the PBCH with a value of 15 and a field of $\bar{a}_{\bar{A}+5}$ in the content of the PBCH with a value of 1 or for a second carrier frequency range, GSCN-Current−[pdcch-ConfigSIB1/16] to GSCN-Current+pdcch-ConfigSIB1 mod 16 when the field of ssb-SubcarrierOffset in the content of the PBCH with a value of 15

In such embodiment, the pdcch-ConfigSIB1 comprises a 8-bit long in the content of the PBCH.

In such embodiment, the frequency range in which no other SS/PBCH blocks configured with the PDCCH including the scheduling information for the RMSI are transmitted is given by GSCN-Current when pdcch-ConfigSIB1=0.

In such embodiment, the second frequency location on which other SS/PBCH blocks configured with the PDCCH including the scheduling information for the RMSI are transmitted is indicated by at least one of for a first carrier frequency range 1, GSCN-Current+256*(ssb-SubcarrierOffset−8)+pdcch-ConfigSIB1+1 when a field of ssb-SubcarrierOffset in the content of the PBCH based on a value from {8, 9, 10} and a field of $\bar{a}_{\bar{A}+5}$ in the content of the PBCH with a value of 1, for the first carrier frequency range 1, GSCN-Current−256*(ssb-SubcarrierOffset−11)−pdcch-ConfigSIB1−1 when the field of ssb-SubcarrierOffset in the content of the PBCH based on a value from {11, 12, 13} and the field of $\bar{a}_{\bar{A}+5}$ in the content of the PBCH with a value of 1, for a second carrier frequency range, GSCN-Current+pdcch-ConfigSIB1+1 when the field of ssb-SubcarrierOffset in the content of the PBCH with a value of 12, or for the second carrier frequency range, GSCN-Current−pdcch-ConfigSIB1−1 when the field of ssb-SubcarrierOffset in the content of the PBCH with a value of 13.

In such embodiment, the pdcch-ConfigSIB1 is a 8-bit long in the content of the PBCH, and the SS/PBCH block is configured with a PDCCH including the scheduling information for the RMSI on the determined GSCN-Current, determining the scheduling information for the RMSI based on a multiplexing pattern of the SS/PBCH block and a control resource set (CORESET) including the PDCCH, the scheduling information for the RMSI including at least a time-domain resource allocation of a physical downlink shared channel (PDSCH) for RMSI.

In step 1204, the BS identifies a first frequency location (GSCN-Current) based on a set of predefined synchronization rasters that is determined by a global synchronization channel number (GSCN) to transmit the SS/PBCH block.

In step 1206, the BS determines, based on the GSCN-Current, a configuration for at least one of the SS/PBCH block that is associated with a physical downlink control channel (PDCCH) including scheduling information for remaining minimum system information (RMSI) on the GSCN-Current or the SS/PBCH block that is not associated with the PDCCH including the scheduling information for the RMSI on the GSCN-Current.

In step 1208, the BS determines, when the SS/PBCH block is not associated with the PDCCH including the scheduling information for the RMSI on the GSCN-Current, the configuration to include at least one of a frequency range in which no other SS/PBCH blocks configured with the PDCCH including the scheduling information for the RMSI are transmitted, the frequency range determined based on the GSCN, or a second frequency location on which other SS/PBCH blocks configured with the PDCCH including the scheduling information for the RMSI are transmitted, the GSCN-Current determined based on the GSCN.

In step 1210, the BS identifies, based on the determined configuration, content of a PBCH included in the SS/PBCH block.

In step 1212, the BS transmits, to a user equipment (UE), the SS/PBCH block including the PBCH using the GSCN-Current over downlink channels.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method of receiving a signal by a terminal in a wireless communication system, the method comprising:
    receiving, from a base station, a first synchronization signal/physical broadcast channel (SS/PBCH) block;
    identifying a frequency position of a second SS/PBCH block associated with a control resource set (CORESET) for system information based on first information included in the first SS/PBCH block and second information included in the first SS/PBCH block, wherein the first SS/PBCH block is not associated with the CORESET;
    receiving, from the base station, the system information by monitoring a physical downlink control channel (PDCCH) in the CORESET based on the second SS/PBCH block; and
    determining, based on the second information, that there is no SS/PBCH block including an associated CORESET within a global synchronization channel number (GSCN) range, besides the second SS/PBCH block, wherein the first information corresponds to a first value within a second value range,
    wherein the first SS/PBCH block is not associated with the CORESET for the system information, wherein the first information corresponds to the second value range.

2. The method of claim 1, wherein:
    a start of the GSCN range is indicated by four most significant bits (MSBs) of the second information, and
    an end of the GSCN range is indicated by four least significant bits (LSBs) of the second information.

3. The method of claim 1, further comprising determining that there is no information on the second SS/PBCH block associated with the CORESET in the first SS/PBCH block, wherein the first information corresponds to the first value and the second information corresponds to a second value.

4. The method of claim 1, wherein:
the frequency position of the second SS/PBCH block is determined based on a GSCN of the first SS/PBCH block and a GSCN offset,
the GSCN offset is indicated by the second information, wherein the first information corresponds to a third value within the second value range, and
the first information indicates a subcarrier offset between the first SS/PBCH block and a resource block grid.

5. A method of transmitting a signal by a base station in a wireless communication system, the method comprising:
transmitting, to a terminal, a first synchronization signal/physical broadcast channel (SS/PBCH) block;
transmitting, to the terminal, a second SS/PBCH block, wherein a frequency position of the second SS/PBCH block which is associated with a control resource set (CORESET) for system information is identified based on first information included in the first SS/PBCH block and second information included in the first SS/PBCH block, wherein the first SS/PBCH block is not associated with the CORESET;
transmitting, to the terminal, the system information based on the second SS/PBCH block; and
indicating, using the second information, that there is no SS/PBCH block including an associated CORESET within a global synchronization channel number (GSCN) range, besides the second SS/PBCH block, wherein the first information corresponds to a first value within a second value range,
wherein the first SS/PBCH block is not associated with the CORESET for the system information, wherein the first information corresponds to the second value range.

6. The method of claim 5, wherein:
a start of the GSCN range is indicated by four most significant bits (MSBs) of the second information, and
an end of the GSCN range is indicated by four least significant bits (LSBs) of the second information.

7. The method of claim 5, further comprising indicating that there is no information on the second SS/PBCH block associated with the CORESET in the first SS/PBCH block, wherein the first information corresponds to the first value and the second information corresponds to a second value.

8. The method of claim 5, wherein:
the frequency position of the second SS/PBCH block is determined based on a GSCN of the first SS/PBCH block and a GSCN offset,
the GSCN offset is indicated by the second information, wherein the first information corresponds to a third value within the second value range, and
the first information indicates a subcarrier offset between the first SS/PBCH block and a resource block grid.

9. A terminal for receiving a signal in a wireless communication system, the terminal comprising:
a transceiver configured to transmit and receive a signal; and
a controller operably connected to the transceiver, the controller configured to:
receive, from a base station via the transceiver, a first synchronization signal/physical broadcast channel (SS/PBCH) block,
determine whether the first SS/PBCH block is associated with a control resource set (CORESET) for system information based on first information included in the first SS/PBCH block,
identify a frequency position of a second SS/PBCH block associated with the CORESET for the system information based on the first information and second information included in the first SS/PBCH block, in case the first SS/PBCH block is not associated with the CORESET;
receive, from the base station, the system information by monitoring a physical downlink control channel (PDCCH) in the CORESET based on the second SS/PBCH block, and
determine, based on the second information, that there is no SS/PBCH block including an associated CORESET within a global synchronization channel number (GSCN) range, besides the second SS/PBCH block, in case the first information corresponds to a first value within a second value range,
wherein the first SS/PBCH block is associated with the CORESET for the system information, in case the first information corresponds to a first value range, and
wherein the first SS/PBCH block is not associated with the CORESET for the system information, in case the first information corresponds to the second value range.

10. The terminal of claim 9, wherein:
a start of the GSCN range is indicated by four most significant bits (MSBs) of the second information, and
an end of the GSCN range is indicated by four least significant bits (LSBs) of the second information.

11. The terminal of claim 9, wherein the controller is further configured to determine that there is no information on the second SS/PBCH block associated with the CORESET in the first SS/PBCH block, in case the first information corresponds to the first value and the second information corresponds to a second value.

12. The terminal of claim 9, wherein:
the frequency position of the second SS/PBCH block is determined based on a GSCN of the first SS/PBCH block and a GSCN offset,
the GSCN offset is indicated by the second information, in case the first information corresponds to a third value within the second value range, and
the first information indicates a subcarrier offset between the first SS/PBCH block and a resource block grid.

13. A base station for transmitting a signal in a wireless communication system, the base station comprising:
a transceiver configured to transmit and receive a signal; and
a controller operably connected to the transceiver, the controller configured to:
transmit, to a terminal via the transceiver, a first synchronization signal/physical broadcast channel (SS/PBCH) block, wherein whether the first SS/PBCH block is associated with a control resource set (CORESET) for system information is indicated based on first information included in the first SS/PBCH block,
transmit, to the terminal via the transceiver, a second SS/PBCH block, wherein a frequency position of the second SS/PBCH block which is associated with the CORESET for the system information is identified based on the first information and second information included in the first SS/PBCH block, in case the first SS/PBCH block is not associated with the CORESET;
transmit, to the terminal via the transceiver, the system information based on the second SS/PBCH block; and indicate, using the second information, that there is no SS/PBCH block including an associated CORESET within a global synchronization channel number (GSCN) range, besides the second SS/PBCH block, in case the first information corresponds to a first value within a second value range, wherein the first SS/PBCH block is associated with the CORESET for the system information, in case the first information corresponds to a first value range, and wherein the first SS/PBCH block is not associated with the CORESET for the system information, in case the first information corresponds to the second value range.

14. The base station of claim 13, wherein:

a start of the GSCN range is indicated by four most significant bits (MSBs) of the second information, and an end of the GSCN range is indicated by four least significant bits (LSBs) of the second information.

15. The base station of claim 13, wherein the terminal determines that there is no information on the second SS/PBCH block associated with the CORESET in the first SS/PBCH block, in case the first information corresponds to the first value and the second information corresponds to a second value.

16. The base station of claim 13, wherein:

the frequency position of the second SS/PBCH block is determined based on a GSCN of the first SS/PBCH block and a GSCN offset, the GSCN offset is indicated by the second information, in case the first information corresponds to a third value within the second value range, and the first information indicates a subcarrier offset between the first SS/PBCH block and a resource block grid.

* * * * *

UNITED STATES PATENT AND TRADEMARK OFFICE
CERTIFICATE OF CORRECTION

| | | |
|---|---|---|
| PATENT NO. | : 11,070,333 B2 | Page 1 of 1 |
| APPLICATION NO. | : 16/218137 | |
| DATED | : July 20, 2021 | |
| INVENTOR(S) | : Hongbo Si and Young Han Nam | |

It is certified that error appears in the above-identified patent and that said Letters Patent is hereby corrected as shown below:

On the Title Page

On Page 2, Column 1, Item (60), Line 2, "62/614,716" should read --62/614,718--.

Signed and Sealed this
Twenty-sixth Day of April, 2022

Katherine Kelly Vidal
*Director of the United States Patent and Trademark Office*